(12) United States Patent
Cosneau et al.

(10) Patent No.: US 12,181,419 B2
(45) Date of Patent: Dec. 31, 2024

(54) STATION AND METHOD FOR TRANSLATIONALLY DETECTING GLAZE DEFECTS ON GLASS CONTAINERS

(71) Applicant: TIAMA, Saint-Genis-Laval (FR)

(72) Inventors: Laurent Cosneau, Soucieu-en-Jarrest (FR); Pascal Fillon, Grezieu la Varenne (FR)

(73) Assignee: TIAMA, Saint-Genis-Laval (FR)

( * ) Notice: Subject to any disclaimer, the term of this patent is extended or adjusted under 35 U.S.C. 154(b) by 170 days.

(21) Appl. No.: 17/918,154

(22) PCT Filed: Apr. 9, 2021

(86) PCT No.: PCT/FR2021/050634
§ 371 (c)(1),
(2) Date: Oct. 11, 2022

(87) PCT Pub. No.: WO2021/209704
PCT Pub. Date: Oct. 21, 2021

(65) Prior Publication Data
US 2023/0136734 A1 May 4, 2023

(30) Foreign Application Priority Data

Apr. 16, 2020 (FR) ...................................... 20 03830

(51) Int. Cl.
*G01N 21/90* (2006.01)
*G01N 21/88* (2006.01)

(52) U.S. Cl.
CPC ..... *G01N 21/9036* (2013.01); *G01N 21/8806* (2013.01); *G01N 21/8851* (2013.01); *G01N 21/9054* (2013.01); *G01N 2021/8887* (2013.01)

(58) Field of Classification Search
CPC .......... G01N 21/9036; G01N 21/8806; G01N 21/8851; G01N 21/9054; G01N 2021/8887
See application file for complete search history.

(56) References Cited

U.S. PATENT DOCUMENTS

| 4,293,219 A | 10/1981 | Ducloux |
| 4,751,386 A | 6/1988 | Gardner |

(Continued)

FOREIGN PATENT DOCUMENTS

| DE | 38 15 539 | 11/1989 |
| DE | 295 04 073 | 5/1995 |

(Continued)

*Primary Examiner* — Hung V Nguyen
(74) *Attorney, Agent, or Firm* — Bauer & Joseph

(57) ABSTRACT

A station for detecting glass disease-type defects in a segment of containers includes: a non-deformable support on which the projectors and the imagers are mounted by a complete connection so as to fix beam directions of the projectors and the optical axes of the imagers; several sets of projectors each include at least six projectors whose beam direction is tangent to a cylinder with a diameter included in a determined range of diameters; an electronic system configured to inspect the containers falling within all of the ranges of diameters, such that during inspection of the containers whose segment diameter to be inspected is included in the range of diameters of a set, the electronic system ensures acquisition of at least six images of each container when it passes through the inspection area by selectively activating the at least six imagers simultaneously with the associated projectors of said set.

17 Claims, 15 Drawing Sheets

(56) References Cited

U.S. PATENT DOCUMENTS

| | | | |
|---|---|---|---|
| 5,072,127 A | 12/1991 | Cochran et al. | |
| 10,261,029 B2* | 4/2019 | Will | G01N 21/9009 |
| 11,308,601 B2* | 4/2022 | Dordoni | H04N 23/56 |
| 11,633,763 B2* | 4/2023 | Kress | G01N 21/9036 |
| | | | 382/143 |
| 2001/0048524 A1 | 12/2001 | Sones | |
| 2010/0128120 A1 | 5/2010 | Garin | |
| 2020/0331741 A1* | 10/2020 | Buchwald | B65C 3/14 |

FOREIGN PATENT DOCUMENTS

| | | |
|---|---|---|
| EP | 2 434 276 | 3/2012 |
| WO | 81/03706 | 12/1981 |
| WO | 00/43757 | 7/2000 |

* cited by examiner

STATION AND METHOD FOR TRANSLATIONALLY DETECTING GLAZE DEFECTS ON GLASS CONTAINERS

TECHNICAL FIELD

The present invention relates to the technical field of the inspection of empty glass containers, such as for example bottles, jars, flasks with a view to detecting possible glass disease-type defects.

The present invention relates more specifically to the checking of glass disease-type defects on empty glass containers, traveling in line after their manufacture with a view to determining whether such containers meet required criteria of absence of defects.

PRIOR ART

After their manufacture, the empty glass containers are subject to various checks as to the presence of defects including the presence of glass diseases. Thus, it is known that the presence of glass diseases in a glass container is generally a serious problem of quality because it almost always results in lower mechanical strength.

To detect glass diseases, a region of the container is illuminated, under specific incidences, by means of projectors emitting, in the direction of said region, (convergent or slightly divergent) directed light beams. The directed light beams reach the surface of the container at a specific incidence so that the major part of the beam enters the glass wall and propagates in the glass. If a glass disease is present on the light path in the wall, then the glass disease reflects the beam which leaves in a modified direction to leave the wall according to a specific output angle, which is a function of the incident angle and of the position and shape of the glass disease. There is observed, at specific observation angles adapted to the output angles of the beams reflected by the glass diseases, the region illuminated by means of light sensors, for example photodiodes as in patent application EP 0 053 151, photodiode arrays, or image sensors such as linear or matrix cameras as in patent applications EP 1 147 405 and EP 2 082 217. This observation is made at specific observation angles such that the incident light reflected by a glass disease-type defect is collected/observed by the light sensors, which will receive light only when passing through a glass disease during the rotation of the container about its vertical axis. Indeed, the known detections generally involve rotating the container to be inspected about a central axis, over at least one turn.

Conventionally, the containers are conveyed on the production lines, on web or chain conveyors, at the most stable translation speed possible in order to limit all the conveying accidents such as falls, collisions and jams caused by sudden accelerations and decelerations. The solutions for detecting glass diseases requiring a rotation of each container about its vertical axis therefore have a certain number of drawbacks because these solutions particularly require interrupting the translation of the containers. To carry out this inspection in rotation, the containers should be significantly slowed down and stopped, taken out of the conveyor using handling systems and then put back in translation on the conveyors. Furthermore, these handling systems (guides, star wheels, drive rollers, etc.) require heavy adaptations to the changes in the format of the containers. Particularly, format adaptations often consist of operations of dismounting and mounting tools specific to the container models, as well as operations of setting these handling systems. Furthermore, these handling systems are quite poorly adapted to the handling of containers of non-round section. They are also limited in speed, typically they halve the rate of the inspection lines, which is not required by the in-line inspection systems.

Finally, the complex handling operations are frequently the cause of breakages, line blockages or stoppages leading by accumulation to significant productivity losses. The contacts of the containers with the guides, star wheels, drive rollers, etc. are sources of unnecessary deterioration of the containers and pose problems of maintenance of the wear pieces, which are quite costly.

To overcome the drawbacks related the detection of glass diseases by rotation of the containers, there are devices that allow a detection of some glass diseases when the container is in translation. Document US 4 293 219 gives a solution without a camera. In this solution, the sensors each contain a single photosensitive element collecting all the reflected light perceived in a receiving cone defined by the focal length of its lens and its opening. It is impossible to distinguish the shape of the observed reflective objects, nor their specific location in the field of the sensors, such that it is not possible to discriminate the small objects that is to say differentiate between a small glass disease and a small stray element.

The ARGOS machine, marketed by the Applicant, is a machine for detecting glass diseases in translation with cameras which does not require the rotation of the container about its central axis. The cameras improve the detection, since images of each lighted region are taken. It is provided to detect glass diseases on the finish and on part of the shoulder of a container. It implements a lighting and observation head, in which the directed light emitters and the endoscope heads are organized according to the diameter of the finish of the container. The lighting and observation head forms a tunnel through which the neck of the containers circulates during their translation through the installation for the inspection. Endoscopes are used to bring a number of images acquired according to various directions of observation, on a number of sensors reduced to two or three. For example, all the endoscopes intended for the detection of vertical glass diseases (by clockwise or counterclockwise tangential illumination), are connected to a single camera. In a first station, only one image acquisition is made per container for the detection of vertical glass diseases, and in a second separate station, only one image acquisition is made per container for the detection of horizontal glass diseases. In order to avoid interferences between emitters and receivers activated simultaneously in the first station, a separation of the emitter/receiver pairs by the color is used, in other words there are red light emitters which cooperate with endoscope heads equipped with red filters and emitters of green light which cooperate with endoscope heads fitted with green filters, which only authorizes a reduced number of image acquisition conditions in a station.

Patent EP 2 434 276 describes a machine which detects glass diseases on the neck of a container by combining two orthogonal translations, since a vertical translation is combined with the horizontal travel translation. A handling device is provided to allow a vertical displacement. Such a handling device is bulky and occupies space around the containers because the lifting elements engaging on the opposite sides of the container to pick up the container hide parts of the containers which cannot be inspected. These hidden parts of the containers represent a relatively large part, at least in the case of low-height containers. In other words, the system is not adapted to small items such as cosmetic or pharmacy flasks. In addition, to inspect two parts of the containers having different segments such as the finish and the base of the containers, this machine requires the serialization of two handling and inspection stations leading to a costly and cumbersome installation.

The present invention aims to overcome the drawbacks of the prior art by proposing a station for inspecting glass containers capable of detecting, at high rate, any glass disease in the different segments of containers falling within different diameters.

Disclosure of the Invention

The object of the invention is to propose a station for detecting glass disease-type defects in a segment of containers having a central axis and traveling along a direction of translation, without rotation about their central axis, the station including:

a support disposed along a path in which circulates at least one segment of the containers extending below an inspection reference plane for the finish or above an inspection reference plane for the base, this circulation path successively comprising an inlet, an inspection area and an outlet for the containers;

at least six imagers forming images and having an optical axis directed inwardly of the inspection area by being mounted on the support such that their optical axes are distributed about the central axis of the containers by choosing their azimuth angles between 0 and 360° relative to the direction of translation, so that all the points of the circumference of the segment of the containers are represented in at least one image acquired when the container segment passes through the inspection area;

at least twelve projectors forming several sets each including at least six projectors mounted on the support, each having a beam direction and positioned on the support such that:
  (a) the beam directions are tangent to a cylinder centered on the central axis of the container, the diameter of the cylinder being included in a range of diameters of container segments;
  (b) the beam directions are distributed in azimuth such that when the projectors are selectively activated for image acquisitions by the associated imagers, all the points on the circumference of the segment of the containers are lighted by at least one of the projectors;

an electronic system connected to the projectors and to the imagers and adapted to selectively activate the imagers simultaneously with associated projectors so as to acquire images of each container passing through the inspection area with a view to their analysis in order to detect defects.

According to the invention:

the support is a non-deformable body on which the projectors and the imagers are mounted by a complete connection so as to fix, relative to said support, the beam directions of the projectors and the optical axes of the imagers, this support including a free volume encompassing at least the volume generated by the profile of the containers only according to the rectilinear translation of the containers in the inspection area, the imagers and the projectors being located outside this free volume;

several sets of projectors each include at least six projectors whose beam direction is tangent to a cylinder of a diameter included in a determined range of diameters, these ranges of diameters being different from one set to another and depending on the diameter of the segment of the container;

the projectors of the sets have a beam direction with elevation angles of an absolute value between 0° and 45° and opposite in sign to the elevation angles of the optical axes of the associated imagers;

the imagers have optical axes whose elevation angles have an absolute value between 0° and 60° and are opposite in sign to the elevation angles of the beam directions of the associated projectors;

the electronic system is configured to inspect the containers falling with all of said ranges of diameters, such that during the inspection of the containers whose segment diameter to be inspected is included in the range of diameters of a set, the electronic system ensures the acquisition of at least six images of each container when it passes through the inspection area by selectively activating the at least six imagers simultaneously with the associated projectors of said set.

According to one advantageous variant of embodiment, the projectors of the different sets are disposed in an arrangement comprising, side by side and/or in a juxtaposed manner, a controllable projector of each set, said arrangement being repeated to distribute the controllable projectors in azimuth about the central axis of the containers.

According to another advantageous variant of embodiment, the sets of projectors include several sub-sets each including at least six projectors and each with an elevation angle of a different absolute value of at least 5°.

Advantageously, each set includes at least six projectors with beam directions having in azimuth, an incidence on the clockwise tangential container segment, and at least six projectors with beam directions having in azimuth an incidence on the counterclockwise tangential container segment.

For example, the support delimits the free volume with a width such that the projectors positioned at the same height as the free volume, have a beam direction with azimuth angles between +5° and +175° and between +185° and +355°.

According to one preferred example of implementation, the support delimits the circulation path for a segment of the containers corresponding to the finish or to the base of the containers.

To detect in particular horizontal glass diseases, several groupings of at least six projectors are mounted by a complete connection on the support while being located outside the free volume, the projectors of a grouping illuminating a container segment included in a range of diameters, said range being different from one grouping to another, the projectors of a grouping being selectively activated in a synchronized manner with associated imagers during each image acquisition by said associated imagers, such that all the points of the circumference of the segment of the containers to be inspected are lighted by at least one of the projectors, the projectors of a grouping having a beam direction according to an elevation of the same sign as the elevation of the optical axis of the associated imagers.

Typically, the support has two openings arranged diametrically opposite to each other according to a fixed profile and defining the inlet and the outlet of the circulation path of the containers and framing the free volume.

According to one advantageous characteristic of embodiment, the support includes a positioning system for the imagers and the projectors, ensuring for each one a unique position, relative to a reference plane for the support, of the beam direction of the projector and of the optical axis of the imager.

According one preferred exemplary embodiment, the positioning systems for the imagers and the projectors are arranged on the support to allow their mounting on the outer face of the support, the support including a multitude of holes for the passage of the light received by the imagers and/or emitted by the projectors.

Advantageously, the support is a non-deformable hollow body having the shape of a polyhedron or of at least one truncated sphere.

Another object of the invention is to propose an inspection installation including:
at least one inspection station in accordance with the invention;
and at least one transport system adapted to ensure the travel, without rotation, of the containers only according to a rectilinear direction of translation, in the circulation path of each support.

According to one variant of implementation, the inspection installation according to the invention includes:
a station for inspecting the finishes of the containers provided with a support delimiting a circulation path for a segment of the containers corresponding to the finish, and/or;
a station for inspecting the bodies of the containers provided with a support delimiting a circulation path for a segment of the containers corresponding to the body, and/or;
a station for inspecting the bases of the containers provided with a support delimiting a circulation path for a segment of the containers corresponding to the base.

According to such an installation, a setting device allows the inspection reference plane for the containers moved by the translation system to coincide with the reference plane for the support.

Another object of the invention is to propose a method for detecting glass disease-type defects in at least one segment of containers having a central axis, the method being such that:
a determined number of ranges of diameters for the segments of the containers to be inspected is chosen;
the containers are moved without rotation about their central axis only according to a rectilinear direction of translation to travel in a circulation path of a support comprising successively an inlet, an inspection area and an outlet for the containers;
projectors and imagers are mounted by a complete connection on the support so as to fix, relative to the support, the beam directions of the projectors and the optical axes of the imagers, this support including a free volume encompassing at least the volume generated by the profile of the containers only according to the rectilinear translation of the containers in the inspection area, the imagers and the projectors being located outside this free volume;
at least six imagers forming images and having an optical axis directed inwardly of the inspection area are mounted on the support such that their optical axes are distributed about the vertical axis of the containers by choosing their azimuth angles between 0 and 360° relative to the direction of translation, so that all the points of the circumference of the segment of the containers are represented in at least one image acquired when the container segment passes through the inspection area, the imagers having optical axes whose elevation angles have an absolute value between 0° and 90° and are opposite in sign to the elevation angles of the beam directions of the associated projectors;
the projectors form several sets each including at least six projectors whose beam direction is tangent to a cylinder with a diameter centered on the central axis of the container and included in a determined range of diameters, these ranges of diameters being different from one set to another and a function of the diameter of the segment of the containers;
the projectors of the sets have a beam direction with elevation angles of an absolute value between 10° and 45° and opposite in sign to the elevation angles is of the optical axes of the associated imagers, the beam directions being distributed in azimuth such that when the projectors are successively activated for image acquisitions by the associated imagers, all the points on the circumference of the segment of the containers are lighted by at least one of the projectors;
during a phase of inspecting the containers whose container segment diameter is included in the range of diameters of a set, the at least six imagers are activated selectively and simultaneously with the associated projectors of said set to acquire at least six images of each container passing through the inspection area with a view to their analysis in order to detect defects.

The method according to the invention advantageously includes a setting phase during which, depending at least on the range of diameters for the segments of the containers to be inspected:
the list of sets of acquisition parameters is recorded in all the imagers, said sets of acquisition parameters including an integration time, a gain, the coordinates of a ROI, and/or information inhibiting the acquisition;
the list of sets of illumination parameters is recorded in all the projectors, said sets of illumination parameters including a time and/or a light intensity, and/or information inhibiting the illumination.

According to another aspect of the method, during the phase of inspecting each container:
simultaneously addressing, on the one hand, to imagers at least a first signal which triggers for each one the acquisition of images according to a set of acquisition parameters taken from its own list of sets of acquisition parameters, and on the other hand, to projectors a signal which triggers the illumination of the container by each projector according to a set of illumination parameters taken from its own list of sets of illumination parameters, one of the parameters possibly meaning that no illumination is made;
simultaneously addressing in a time-shifted manner, on the one hand, to imagers at least a second signal which triggers another acquisition of images according to another set of acquisition parameters taken from the list of each is imager, and on the other hand, to projectors a second signal which triggers the illumination of the container by the projectors according to another set of illumination parameters.

DESCRIPTION OF THE EMBODIMENTS

As it appears in Figures in particular 1A and 1B, the object of the invention relates to a machine I for online inspection of empty glass containers 2 belonging to a series, with a view to detecting possible glass disease-type defects D. The machine I thus includes one or several inspection stations I1, I2, . . . each having an inspection area Zi in each of which the containers 2 are made to travel along a direction of translation F, using a transport system II of any type known per se. As will be explained in the remainder of the description, the containers 2 are driven only along a rectilinear translation, without a rotational movement about themselves.

Figure 2:
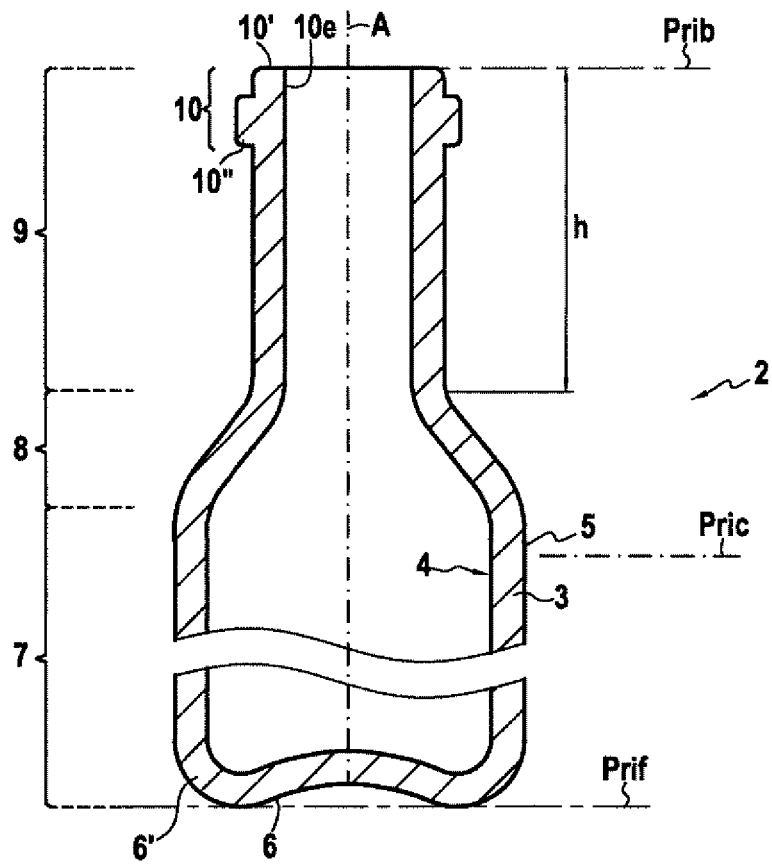
FIG. 2 is a schematic sectional view showing one example of an inspected container.

In general, a container 2 has a central axis A, considered as an axis of symmetry, or an axis of symmetry of revolution. Thus, as illustrated in FIG. 2, a container 2 has a glass wall 3 delimited internally by an inner surface 4 and externally by an outer surface 5. Conventionally, a container 2 is a hollow object whose wall 3 forms, from bottom to top along the central axis A, a base 6 connected to a heel 6' from which a body 7 rises, extending by a shoulder 8 connected to a neck or collar 9 ending with a finish 10 delimiting the mouth 10e that allows filling or emptying the container.

In the case of bottles and some flasks, as opposed to jars, the neck 9 corresponds to a portion of the container with a narrowed diameter relative to the body 7. The shoulder 8 is a portion of connection between the body 7 and the neck 9. For some jars and some other flasks, the shoulder 8 directly connects the body 7 to the finish 10. The upper part of the neck 9 is formed by the finish which comprises the finish surface 10', which is a transverse face, perpendicular to the central axis A of the container, at the upper end of the finish 10. The finish 10 generally comprises a flange 10" which protrudes radially outwardly relative to the neck 9. The lower end of such a flange 10" forms a transverse annular surface facing axially downwards, called counter-finish, and which delimits the lower end of the finish 10.

The central axis A is considered as an axis of symmetry for the containers with a round section, by considering a perfect, uniform and ideal glass distribution relative to the design plane for the container. Obviously, the actual containers are not strictly symmetrical. The distribution of the glass is somewhat heterogeneous. Some containers bear relief decorations or finish nets, etc. Finally, many models of containers called "shaped items" have a body with a non-round section. In most cases, even for the shaped items, the central axis A corresponds to an axis orthogonal to the plane defining the finish surface 10' and centered on the mouth 10e which is circular.

The finish surface 10" defines an upper plane called inspection reference plane for the finish Prib, perpendicular to the central axis A. The base 6 of the container 2 defines a lower plane called inspection reference plane for the base Prif, perpendicular to the central axis A. Similarly, a median plane called inspection reference plane for the body Pric, perpendicular to the central axis A, can be defined. These inspection reference planes Prif, Prib, Pric are parallel to the conveying plane for the containers Pc.

In accordance with the invention, in at least each of the stations for inspecting the installation 1, the containers 2 are transported in a horizontal conveying plane Pc using a transport system II of all types known per se. It should be noted that on the production lines, upstream and downstream of the different inspection stations I1, I2, etc., the containers 2 are transported through their base resting on slat or chain conveyors. The surface of the chain defines the generally horizontal conveying plane. The containers are brought to the inspection stations by conveyors called input conveyors and then re-deposited after inspection, on a conveyor called output conveyor, the input and output conveyors having the same conveying plane. This conveying plane is very generally horizontal, and during conveyance, the central axis of the containers resting on their base remains vertical. It can be envisaged for factory configuration reasons, that the conveying plane has a slight inclination relative to the horizontal, for example the conveyors rise.

Obviously, the inspection stations adapt to these configurations during their installation on the line. By convention, it is considered that the conveying plane is horizontal and the central axis of the containers is vertical.

In the present application, the direction of displacement F of the containers 2 is established along a horizontal axis X of a reference frame X, Y, Z including a vertical axis Z perpendicular to the horizontal axis X and a transverse axis Y perpendicular to the vertical axis Z and to the horizontal axis X, and X and Y being in a plane parallel to a conveying plane for the containers Pc which is horizontal.

The containers 2 are made to travel only along a horizontal rectilinear trajectory in each inspection station I1, I2, . . . using the transport system II which, moreover, must not hinder the inspection of the containers. For example in the case of the inspection of the finish of the containers (left part of FIG. 1A), the transport system II is a conveyor band on which the containers 2 rest through their base 6 while in the case of the inspection of the base 6 of the containers (right part of FIG. 1A), the transport system II is made in the form of a conveyor provided with pairs of opposite side belts enclosing the body in order to ensure a holding by contact with the body 7 of the containers 2 or in the form of a similar conveyor which ensures a holding by contact with the neck of the containers, for example with the counter-finish 10" (right part of FIG. 1B). The containers 2 are thus transported in a horizontal conveying plane Pc parallel to the plane defined by the horizontal axis X and the transverse axis Y. The translation is in the direction F parallel to the axis X of the reference frame chosen by convention.

Figure 1A:
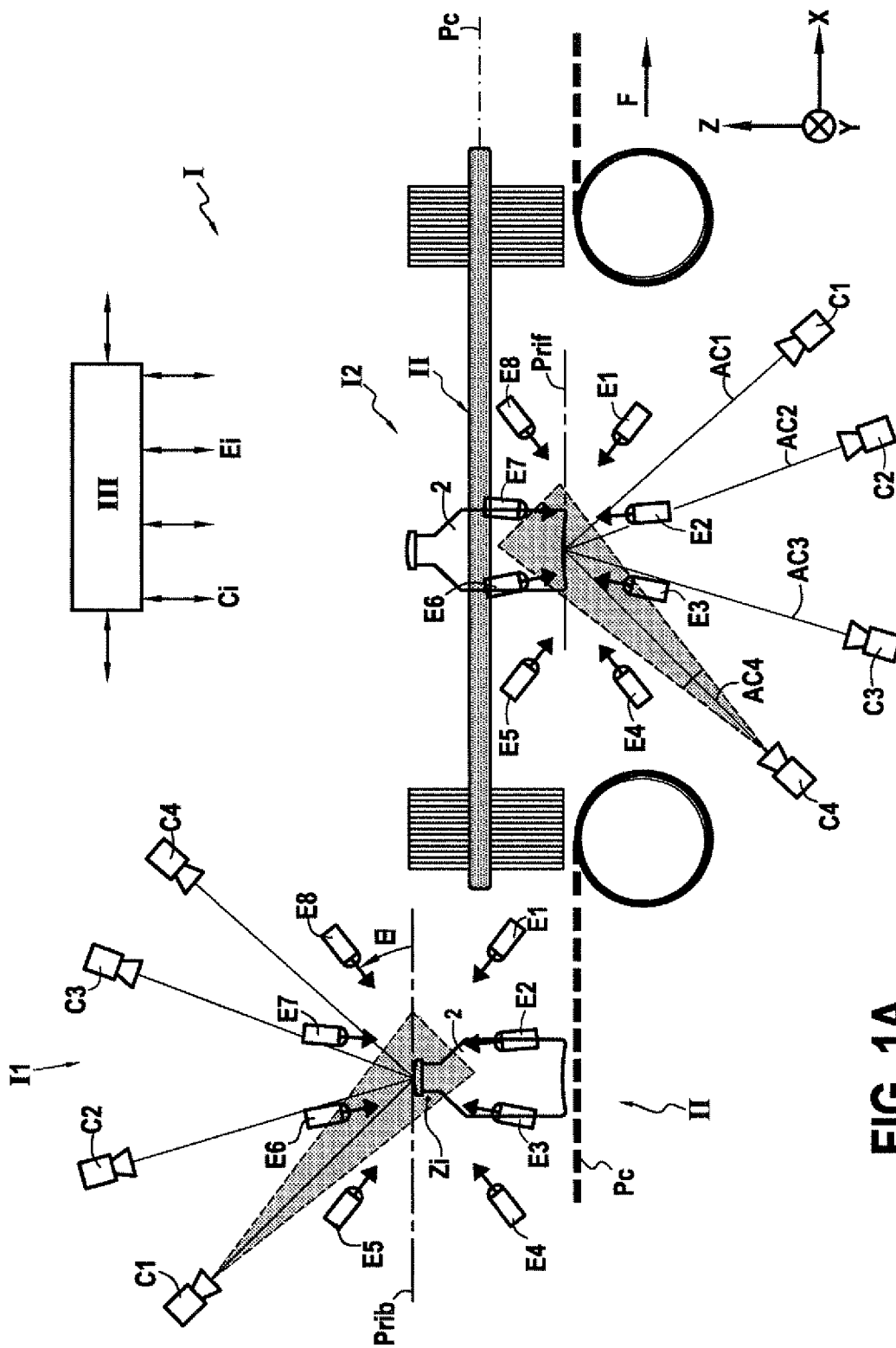
FIG. 1A is a schematic view showing one exemplary embodiment of part of an installation according to the invention, transversely relative to a direction of displacement of the containers.
Figure 1B:
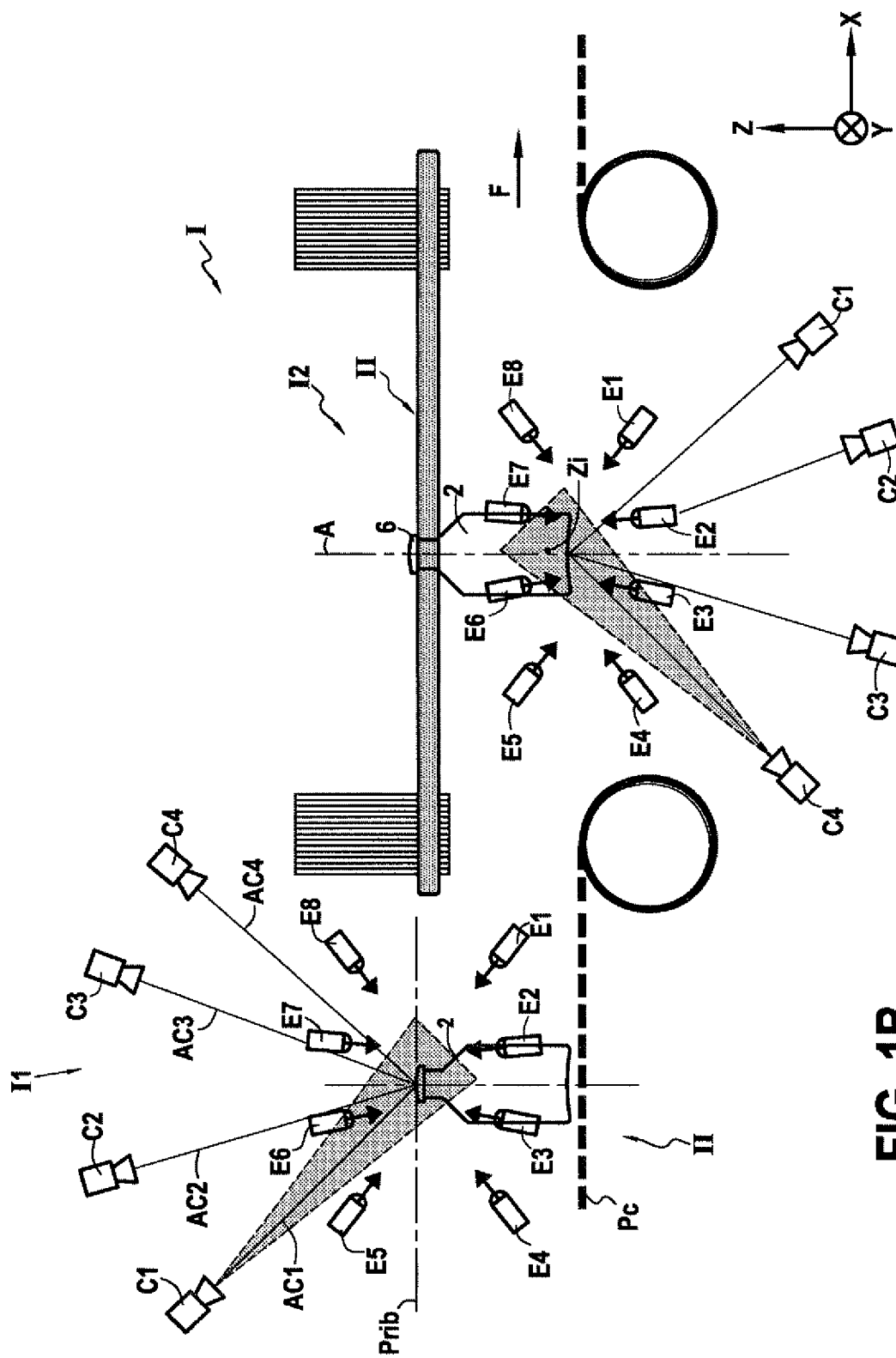
FIG. 1B is a schematic view showing another exemplary embodiment of part of an installation according to the invention, transversely relative to a direction of displacement of the containers.

In the example illustrated in FIG. 1A, the installation 1 successively includes a station I1 for inspecting the finish of the containers (left part of FIG. 1A) and a station I2 for inspecting the base 6 of the containers (right part of FIG. 1A). Of course, this example is given solely by way of illustration, the installation 1 being able to include a different number of inspection stations and stations for inspecting other regions of the containers such as the body for example.

In each of the inspection stations I1, I2, . . . the containers 2 are not subjected to a controlled rotation about their central axis A. This means that it is possible that a rotation of the containers about their central axis A may occur, but in an uncontrolled manner, for example because of a contact with stationary guides of the transport system. Preferably, in each of the inspection stations, and especially in the inspection areas, the containers 2 are fixed in rotation about their central axis A, while moving along the trajectory of displacement F. Preferably, in each of these inspection stations, the containers 2 do not undergo, in operation, the stopping of their displacement along the trajectory of displacement. However, it is generally useful, even necessary, to control the spacing between the containers, in other words the free interval between two successive containers 2 traveling in the installation.

To do so, if the spacing of the containers upstream of the installation is insufficient, it is possible to use a spacer device installed on the trajectory of displacement of the containers. Such a spacer device, which is known furthermore and not described here, operates by creating an acceleration of the containers, preferably upstream of the first inspection station of the installation. Thus, once spaced upstream of the installation, it is not necessary, in operation, that the containers undergo neither acceleration nor deceleration of their displacement along the trajectory of displacement. The displacement of the containers is then stable and avoids the incidents, collisions, falls and accumulations, which ensures a stable production rate with an optimal throughput.

Preferably, the trajectory determined by the transport system II is also rectilinear between the inspection stations, therefore rectilinear along the entire check line. Thus according to the invention, the containers can travel during the glass disease detection inspection, in a uniform rectilinear motion, because the invention does not impose any rotation, accumulation, acceleration or deceleration. However, the invention does not exclude the presence of a change in trajectory or direction of trajectory between two stations. Similarly, the invention does not exclude the presence of a device of the storage table type between two stations where containers can be accumulated.

At the end of their manufacture, the glass containers 2 are inspected without contact, by light rays, with a view to detecting glass disease-type defects by an installation I in accordance with the invention including one or several inspection is stations I1, I2, . . . aiming to check specific regions of the containers, which will be designated later by segments of containers or segments of containers to be inspected. A container segment to be inspected corresponds to the part of the wall of the container extending from a plane perpendicular to the central axis A of the container and over a limited height taken along the central axis A. For example, it can be planned to inspect as segments of the container, the finish 10 extending from the finish surface plane, the base 6 extending from a positioning plane, at least part of the body 7 or the shoulder 8 of the container extending on either side of a plane perpendicular to the normal axis A, or lying between two planes perpendicular to the normal axis A.

Figure 3A:
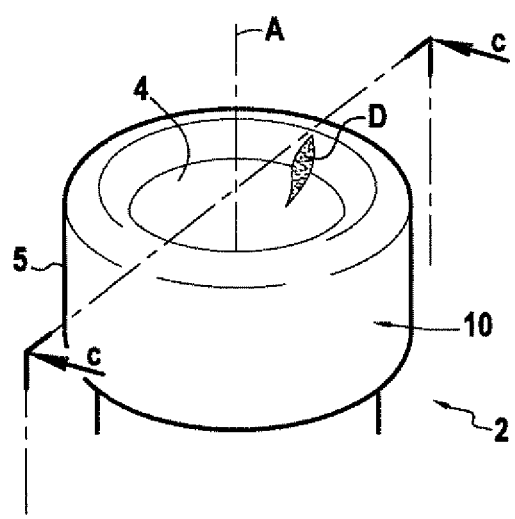
FIG. 3A is a perspective view showing the presence of a vertical glass disease at the finish of a container.
Figure 3B:
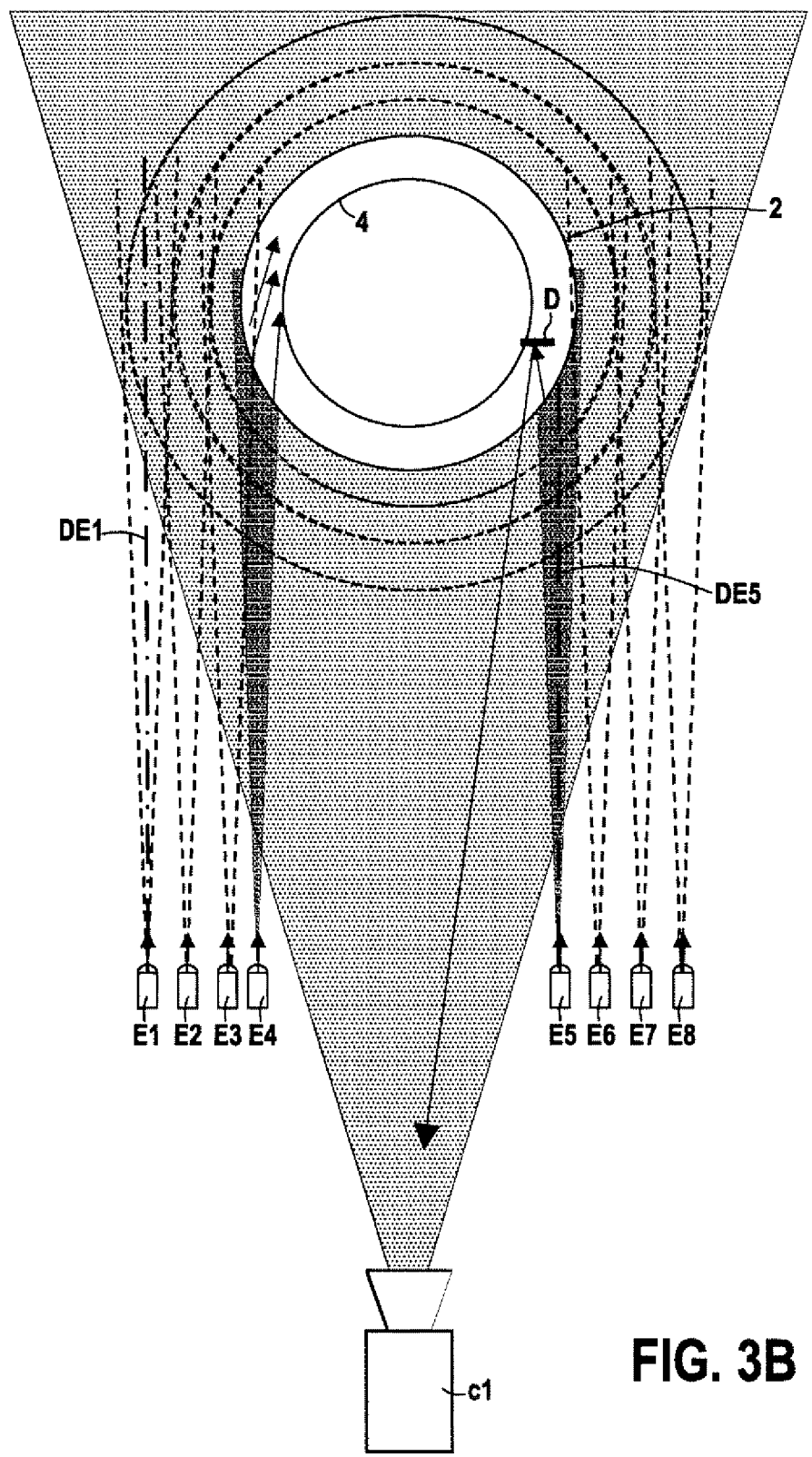
FIG. 3B is a top view showing the principle of detection of the vertical glass disease illustrated in FIG. 3A.
Figure 3C:
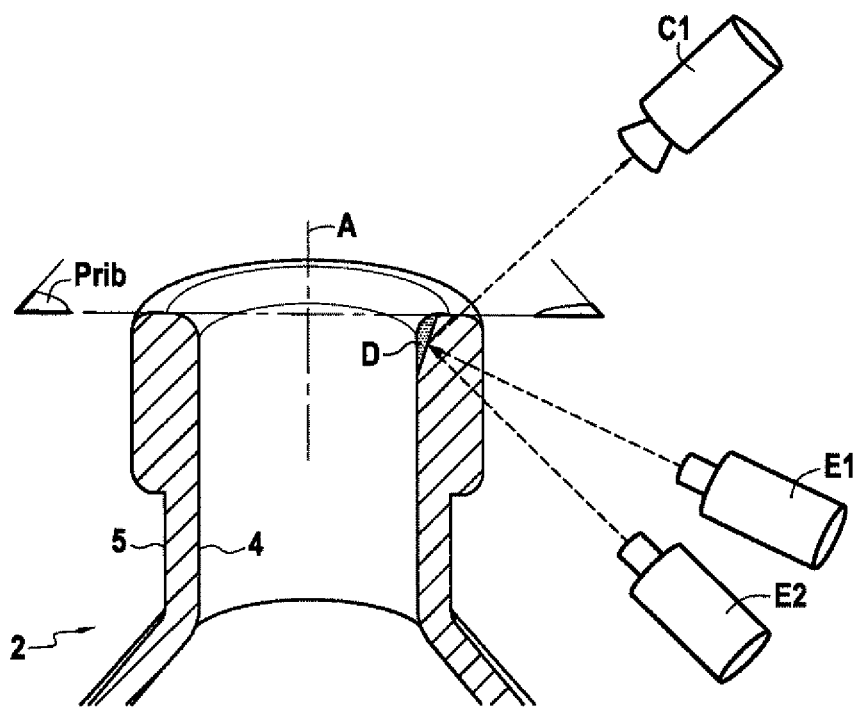
FIG. 3C is an elevation section taken along the lines C-C of FIG. 3A, showing the principle of detection of the vertical glass disease.

Glass diseases are defects like thin cracks generally extending from the surface in the thickness of the wall of the container. A glass disease can be a through-crack over the thickness of the wall, from the inner surface 4 to the outer surface 5 of the wall. However, it is generally a non-through crack D which generally opens out into the outer surface 5 or as illustrated in FIGS. 3A to 3C, on the inner surface 4. A glass disease being a crack, it can be considered as being delimited by two surface elements of the material of the container wall.

These two surface elements face each other and can be generally considered to be parallel to each other, separated by a thin, even infinitesimal, layer of air. These two nearly parallel surface elements are two diopters so that the glass diseases reflect the light that arrives with a certain incidence on these surfaces, according to the specular reflection laws. This is why glass containers are generally inspected by reflection of light beams on the glass diseases.

These surface elements, which are generally non-planar, therefore warped, can have very varied configurations and orientations relative to the container wall area in which the glass disease is formed. In the amorphous material, the cracks do not propagate along cleavage planes. The glass diseases, however, have preferred general shapes and orientations corresponding to the directions of the stresses that are released in the crack. To define a convention of the orientation of a glass disease, an approximation can first be made by considering that these surface elements can be approximated by an approximation plane or by a series is of approximation planes.

Figure 8A:
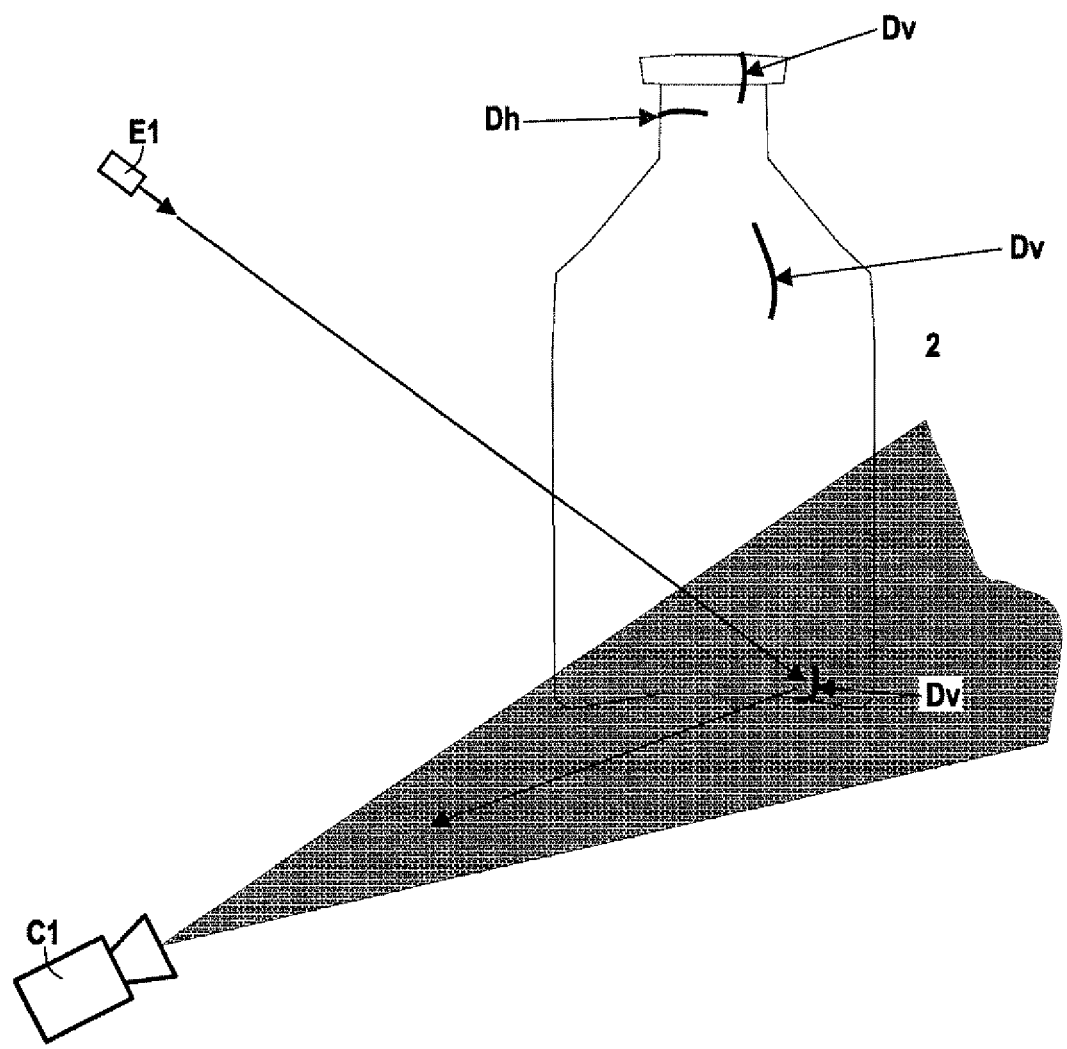
FIG. 8A is a schematic elevation view of a container showing examples of vertical and horizontal glass diseases.

In the field of glass containers, those skilled in the art are accustomed to distinguishing, for the cylindrical or conical portions of the containers, therefore the neck, the collar, the shoulder, the body and the chime, between glass diseases called vertical glass diseases and glass diseases called horizontal glass diseases, based on the main orientation of the cracks relative to the central axis A of the container 2 which is considered to be vertical. The glass diseases called vertical glass diseases therefore have surface elements with a vertical approximation plane or with an inclination relative to the vertical which is less than 45 angle degrees, preferably less than 30 angle degrees. The inclination of a plane relative to the vertical is defined as the acute angle between a normal to this plane and a horizontal plane. It is noted that a vertical plane can be a radial plane containing the central axis of the container or a plane parallel to this axis and forming an angle with such a radial plane. Examples of glass diseases called vertical glass diseases Dv are illustrated in FIG. 8A. The glass diseases called horizontal glass diseases therefore have surface elements with a horizontal approximation plane or with an inclination relative to the horizontal which is less than 45 angle degrees, preferably less than 30 angle degrees. The inclination of a plane relative to the horizontal is defined as the acute angle between a normal to this plane and the vertical direction. One example of a glass disease called horizontal glass disease Dh is illustrated in FIG. 8A.

Figure 8B:
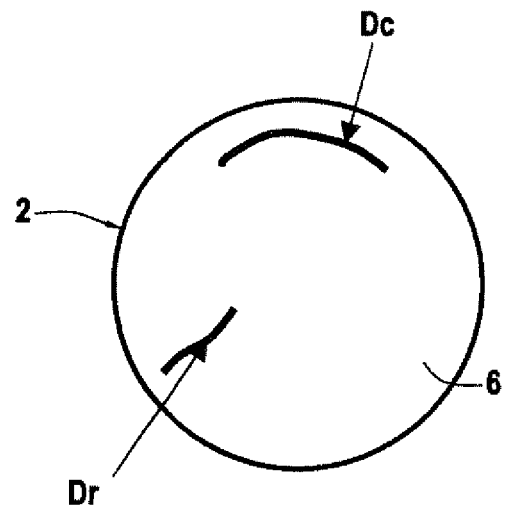
FIG. 8B is a schematic bottom view of a base of a container illustrating examples of radial and circular type glass diseases in the base.
Figure 8C:
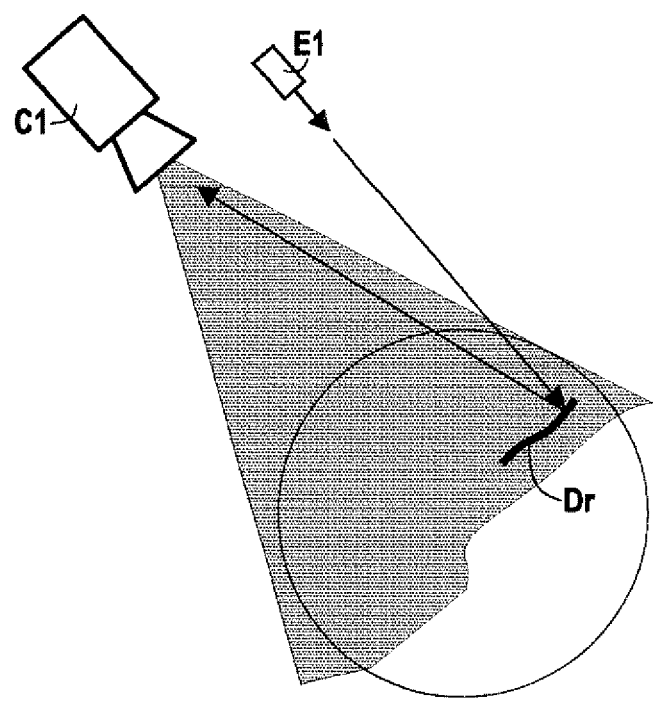
FIG. 8C is a schematic bottom view showing the lighting and observation principle for the detection of glass diseases in the base of the containers.

Concerning the glass diseases located in the base of the containers, which can take the form of a disk or a cone, it is possible to distinguish, as illustrated in FIG. 8B, the radial glass diseases Dr which extend radially in the base and circular glass diseases Dc which extend in an arc of a circle in the base of the containers. Of course other glass diseases have any actual shapes.

The well-known principle of detection of the glass disease-type defects which is implemented by the detection installation in accordance with the invention is based on the detection of the specular reflection of an incident beam. By specular reflection it is meant reflection of a light beam on a reflective surface like a mirror, therefore with zero or negligible scattering, with the reflected angle equal to the incident angle. Thus, each detection station I1, I2, . . . includes controllable directional light emitters E1, E2, . . . Ei, . . . En, lighting the containers whose specular reflections coming from the glass diseases are detected by cameras or controllable shooting heads C1, C2, . . . Ci, . . . Cn, as will be described in detail in the remainder of the description (FIGS. 8A to 8D, 10C).

At least for the detection of the vertical or radial glass diseases, directional light emitters E1, E2, . . . Ei, . . . En are generally used, each emitting a directional light beam along a determined beam direction DE1, DE2, . . . DEi, . . . DEn. A directional incident beam is a beam of light rays having a beam axis or direction and whose rays are contained within a solid angle of lighting about this beam axis, the solid angle being small. The solid angle of the beam is the solid angle for example of a cone of circular section which contains all the light rays of the beam. For simplicity, it is advisable to define not the solid angle in steradian, but the angle of divergence of the incident beam, in a divergence measurement plane which is a section plane of the solid angle containing the axis of the solid angle. Generally, an incident beam is used having, in the inspection area, a divergence angle which is less than 30 angle degrees, preferably less than 25 angle degrees, even more preferably less than 20 angle degrees. A directional incident beam can be a laser beam or another parallel-ray beam defined by a beam axis and a beam diameter. A narrow incident beam can be a beam of divergent rays, or a beam of convergent rays in the inspection area.

In this way, a surface element of the container which is lighted by a directional light emitter, receives therefrom a beam comprising light rays at close incident angles, in other words incident angles whose difference is less than 30 degrees, even 25 degrees, even 20 degrees: it is in this sense that they are called directional. Several directional light emitters which illuminate the same portion of the outer surface of the container allow obtaining incident angles different from those coming from another directional light emitter, the incident angles being adapted to reveal variable orientation glass diseases relative to the outer surface of the container.

The container segment which is located in the inspection area and which is thus lighted by a given directional light emitter, can be comprised in a circle having a diameter ranging from 5 millimeters to 14 millimeters. According to other variants, the container segment which is thus lighted by a given directional light emitter, can be comprised in a circle with a diameter ranging from 5 millimeters to 120 millimeters. The container segment which is lighted can be rectangular, with for example a horizontal width of up to 100 or 120 millimeters to cover an entire finish, and for example a height of 60 millimeters to cover the height of a finish. Of course, the finishes are generally cylinders and the rectangular section of the beam can only be observed by imagining a lighted plane orthogonal to the axis of the beam, positioned in the vicinity of the finish surface or the central axis of the container in the inspection area.

The light rays implemented for the detection are in the photographic field, preferably with a wavelength comprised between 100 nanometers and 20 microns, more preferably in the visible photographic field with wavelengths comprised between 380 and 900 nanometers.

In the context of the present invention, the inspection installation I includes directional light emitters called controllable directional light emitters E1, E2, . . . Ei, . . . En, referred to as projectors in the remainder of the description for the sake of simplification. Switching on and off these projectors is electrically controlled by an electronic system III. Thus, the duration of an emitted light pulse as well as optical characteristics such as intensity or spectral composition or color of the emitted light can be electrically checked.

A projector E1, E2, . . . E1, . . . En includes a light source and generally an optical conditioning device which ends with a light emission surface through which the light beam is emitted in the direction of the segment of the container to be inspected. The light source is for example a light-emitting diode, an incandescent filament, an electric arc source, or a fluorescent source (neon, plasma, etc.). A conditioning device can include one or several optical components among optical lenses, optical condensers, mirrors, light guides (in particular optical fibers), irises, masks, etc. By mask it is meant an opaque piece with a cutout in its center and intended, by obstruction, to give shape to a light beam passing therethrough.

Generally, a projector includes a conditioning device which includes at least one optical lens. A projector can include a conditioning device including a mask located so as to be projected by being optically conjugated with the surface or a surface portion of the container, so that the segment of the container to be inspected is delimited. A rectangular mask allows the segment of the container to be inspected to be rectangular. The mask or diaphragm therefore defines the shape of the cross section of the beam which takes a rectangular or circular shape. This section is observed for example by sectioning the beam by a virtual plane orthogonal to the beam direction. It can therefore be considered that the light beam is delimited by an envelope of conical or pyramidal section. The light source and the optical components of the optical conditioning device are optical elements of the projector. It can be provided that one, or several, or all of the projectors in the installation have their own individual light source. However, it can be provided that several projectors share a common light source. In this case, they can each have their own conditioning device, ending with an individual light emission surface, even if the conditioning devices of several emitters can include one or several common optical components upstream of their individual light emission surface. Typically, a common source can be associated with a bundle of optical fibers including several optical fibers, among which each optical fiber, or each of several groups of optical fibers, belongs to the conditioning device of a separate projector. A projector generally includes a small light emission surface. The emission surface of the projectors is preferably inscribed within a circle of a diameter comprised between 4 millimeters and 30 millimeters. A specific design of the projectors described later in the description can be used in order to electrically check the lighting parameters such as the color, and/or the ignition time and/or the light intensity.

Due to the varied and largely random nature of the orientation of the glass diseases, and due to the use of directional incident beams at least for the vertical glass diseases, it is necessary to provide for several directional incident beams and at least one light receiver to be able to detect a possible glass disease in the s region to be inspected of the container. Generally, several light receivers are provided to collect the specular reflection of an incident beam on the glass diseases.

These light receivers or controllable shooting heads such as cameras are designated in the remainder of the description, by imagers $C1, C2, \ldots Ci, \ldots Cn$. Within the framework of the present invention, these imagers are electrically controlled by the electronic system III that allows controlling the shooting moments and their acquisition parameters. It will be possible to use a specific design of the imagers described later in the description in order to electrically check the acquisition parameters such as the region of interest, and/or the integration time and/or the electronic gain. Typically, an imager $C1, C2, \ldots Ci, \ldots Cn$ has an optical axis respectively $AC1, AC2, \ldots ACi, \ldots ACn$ directed inwardly of the inspection area $Zi$ and a field of view covering all or part of the segment of the containers to be inspected. An imager $C1, C2, \ldots Ci, \ldots Cn$ includes a light sensor and generally an associated optical conditioning device which ends with a light input surface through which the collected light rays enter the light receiver in the direction of the light sensor. The light sensor is for example a photoelectric sensor, which can be for example of the CCD type or of the CMOS type. An optical conditioning device can include one or several optical components among optical lenses, mirrors, light guides (in particular optical fibers), fixed diaphragms such as masks or adjustable diaphragms such as iris diaphragms, etc. In other words, the sensitive area of the light sensor can be arranged at a distance from the light input surface of the light receiver, and can moreover have a different orientation. The conditioning device forms an image of the segment of the container to be inspected or of part of the segment of the container to be inspected, on the light sensor, generally a linear or two-dimensional image. It optically conjugates at least a part of the outer surface of the container with the sensitive surface of the sensor. It also defines the optical axis or the axis of view $AC1, AC2, \ldots ACi, \ldots ACn$ of the imager $C1, C2, \ldots, Ci, \ldots Cn$.

The light sensor and the optical conditioning device are optical elements of the imager $C1, C2, \ldots Ci, \ldots Cn$. It can be provided that one or several or all of the imagers $C1, C2, \ldots Ci, \ldots Cn$ of an inspection station have their own individual light sensor. However, It can be provided that several imagers share a common light sensor. In this case, the imagers with a common light sensor can each have their own optical conditioning device, ending with an individual input emission surface, even if the conditioning devices of several cameras can include one or several common optical components downstream of their individual light input surface. In the preferred variant of embodiment, all the imagers are equipped with two—dimensional image sensors of the CCD or CMOS type, and with an objective lens as a conditioning device, the whole forming what is commonly called a matrix camera.

In accordance with the invention, in an inspection station $I1, I2, \ldots$, the projectors $E1$, and the imagers $C1, C2, \ldots Ci, \ldots Cn$ are mounted by a complete connection 13, on a support 14 forming a non-deformable body, so as to fix, relative to the support 14, the beam directions $DE1, DE2, \ldots DEi, \ldots DEn$ of the projectors and of the optical axes $AC1, AC2, \ldots ACi, \ldots ACn$ of the imagers. In other words, the beam directions $DE1, DE2, \ldots DEi, \ldots DEn$ of the projectors and the optical axes $AC1, AC2, \ldots ACi, \ldots ACn$ of the imagers are fixed relative to a reference plane $Prfs$ for the support 14.

It should be understood that the projectors $E1, E2, \ldots Ei, \ldots En$ and the imagers $C1, C2, \ldots Ci, \ldots Cn$ are mounted without the possibility of movements therebetween even though the station allows an inspection of the containers 2 which, on the one hand, move only along a rectilinear translation and, on the other hand, have different sizes.

Figure 4:
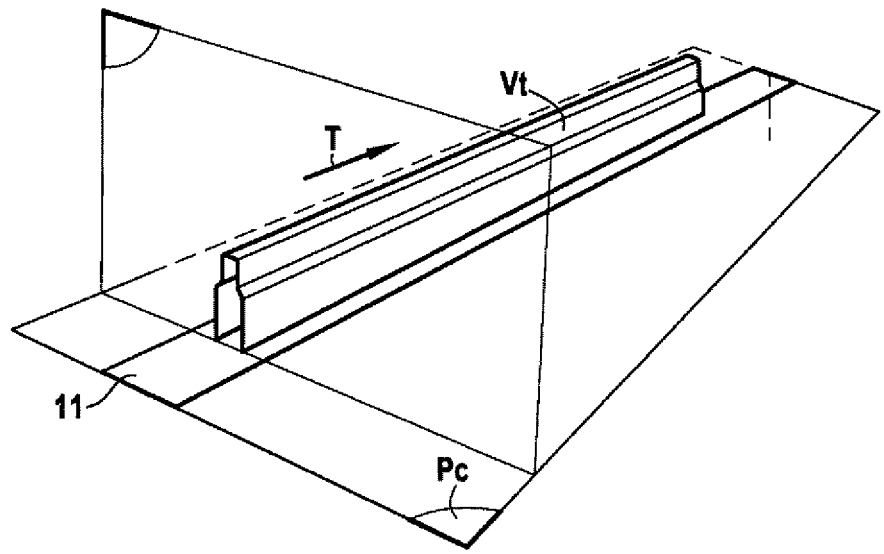
FIG. 4 is a schematic perspective view showing the volume through which the containers pass or generated the containers during their linear displacement in an inspection station.

For this purpose, the projectors $E1, E2, \ldots Ei, \ldots En$ and the imagers $C1, C2, \ldots Ci, \ldots Cn$ are mounted on the support 14 to be located outside a circulation path for the containers corresponding to the free volume $Vt$ encompassing at least the volume generated by the profile of the containers 2 only according to the horizontal translation of the containers in the inspection area $Zi$ of each inspection station. As it appears in FIG. 4, this free volume $Vt$ corresponds at least to the profile of the containers, that is to say to the section of the containers taken in the vertical plane $Y, Z$ perpendicular to the horizontal or conveying plane $Pc$, this section being taken over the entire horizontal rectilinear displacement of the containers in the inspection area. Of course, this free volume $Vt$ can have a section with dimensions greater than the profile of the containers. In this way, the projectors $E1, E2, \ldots En$ and the imagers $C1, C2, \ldots Ci, \ldots Cn$ do not interfere with the horizontal linear displacement of the containers in the inspection area $Zi$.

Figure 5:
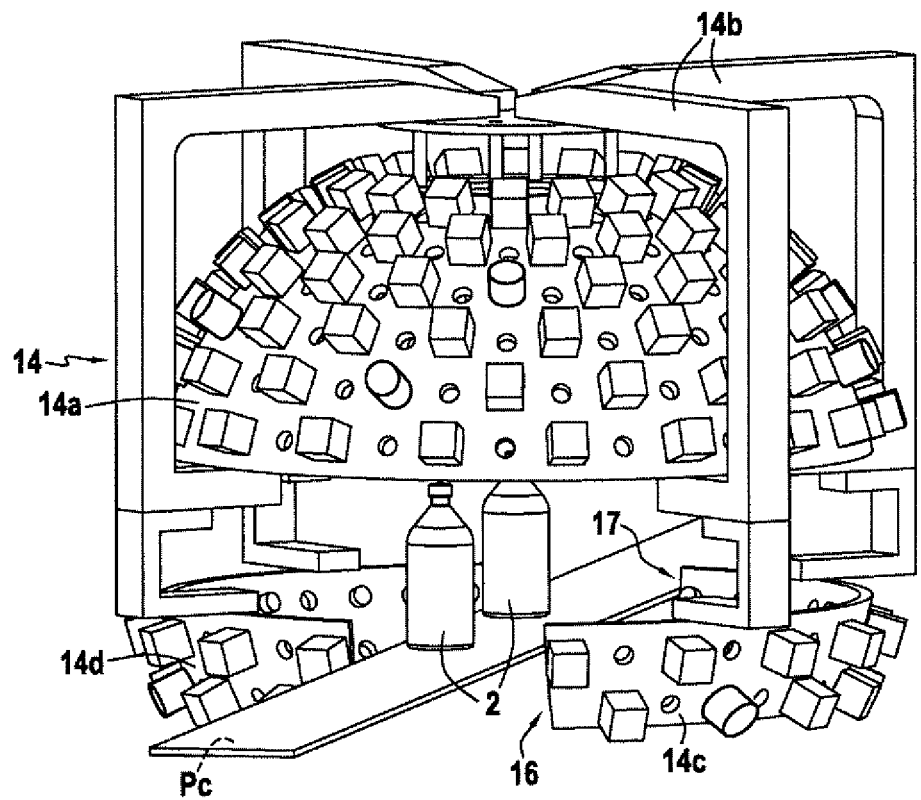
FIG. 5 is a schematic perspective view showing one example of mounting, on a support in an inspection station, of the projectors and the imagers.
Figure 6:
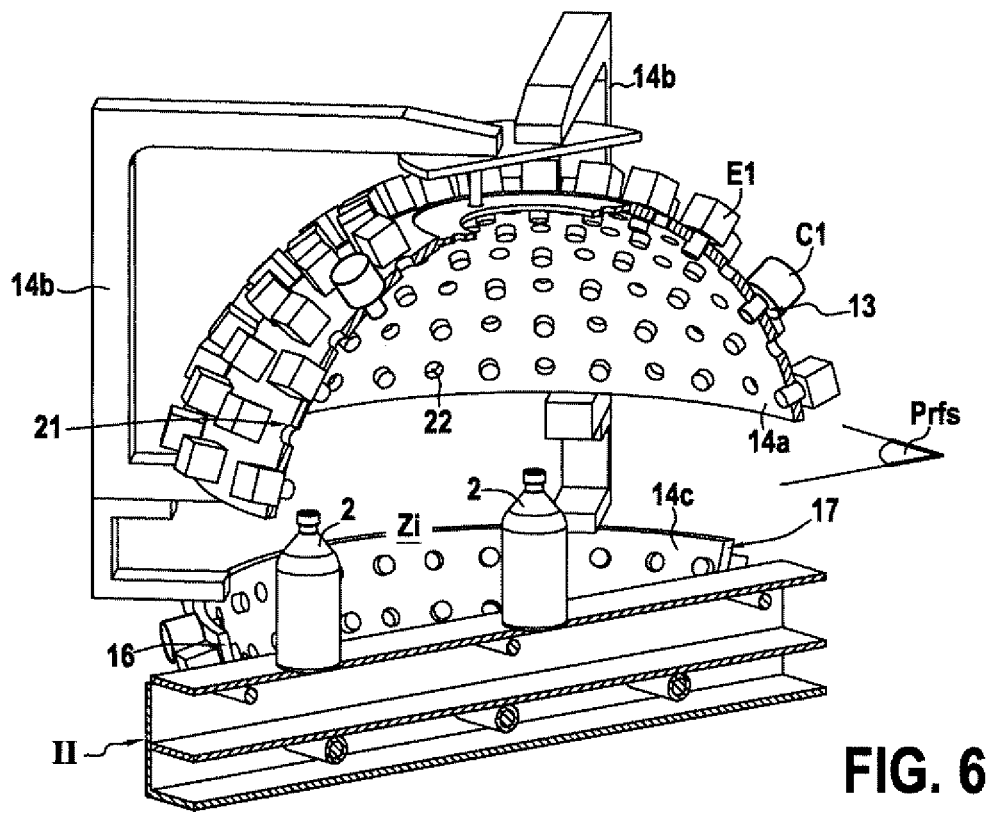
FIG. 6 is an elevation sectional view of the inspection station illustrated in FIG. 5.
Figure 7:
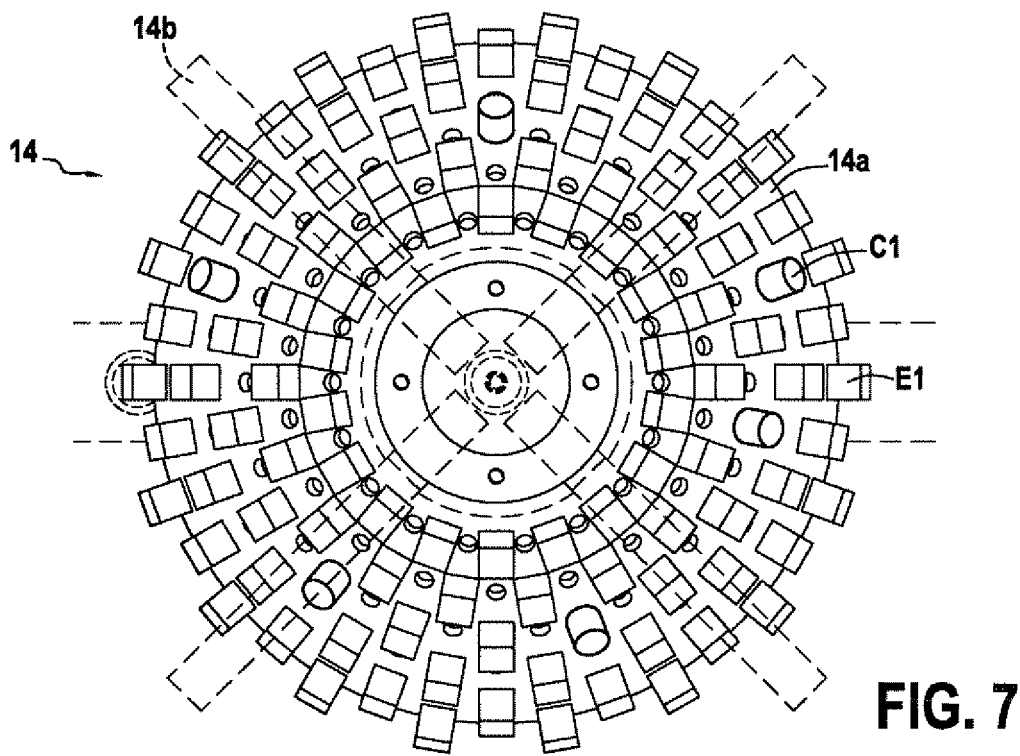
FIG. 7 is a top view of the inspection station illustrated in FIG. 5.

As it appears more specifically in FIGS. 5 to 7, the support 14 is a non-deformable hollow body through which the circulation path $Vt$ of the containers 2 passes such that the projectors $E1, E2, \ldots Ei, \ldots En$ and the imagers $C1$, are positioned around the circulation path, with the beam directions and the optical axes directed inwardly of the support 14 and more specifically, towards the circulation path $Vt$.

This support 14 can be made in any suitable manner to constitute a non-deformable hollow body. Of course, the notion of non-deformable body should be understood as the idealization of the notion of a body in the solid state, considered as rigid and ignoring any deformation. This support 14 can be formed from a single piece or from several pieces rigidly assembled together as illustrated by way of example in the drawings.

The support 14 has the shape for example of a polyhedron or, as in the example illustrated in FIGS. 5 to 7, of a truncated sphere with several sphere portions. More specifically, the support 14 includes a shell 14a in the shape of a half-sphere rigidly connected, by connecting arms 14b, to two complementary shells 14c and 14d in the form of sphere sections from an identical sphere as the sphere forming the shell 14a. The spherical shape of the support 14 facilitates the positioning of the working areas of the shooting heads, that is to say it allows placing the focusing area of each imager in the inspection area Zi.

As indicated above, the support 14 is adapted to define or delimit the circulation path Vt for the containers. The support 14 includes for this purpose an inlet 16, the inspection area Zi and an outlet 17. The inlet 16 and the outlet 17 correspond to two openings arranged in the support 14 diametrically opposite to each other and between which the inspection area Zi formed by the internal void volume of the hollow support extends.

The support 14 is adapted to ensure efficient and easy rigid mounting for the projectors E1, E2, ... Ei, ... En and the imagers C1, C2, ... Ci, ... Cn.

The support 14 includes a positioning system 21 for each imager C1, C2, ... Ci, ... Cn and each projector E1, E2, ... Ei, ... En, ensuring for each one a unique position, relative to the reference plane Prfs for the support 14, of the beam direction DE1, DE2, ... DEi, ... DEn of each projector and of the optical axis AC1, AC2, ... ACi, ... ACn of each imager. Such a positioning system 21 allows easily immobilizing relative to the reference plane Prfs for the support 14, the beam directions DE1, DE2, ... DEi, ... DEn of the projectors and the optical axes AC1, AC2, ... AC1, ... ACn of the imagers. Such positioning systems 21 can be made in any appropriate way and include for example flats arranged on the support to each constitute a positioning housing for the casing of the imagers and/or of the projectors, and/or orifices arranged in the support to receive centering pins carried by the casings of the imagers and/or of the projectors.

According to the exemplary embodiment illustrated in the drawings, the positioning systems 21 for the imagers and the projectors are arranged on the support 14 to allow their mounting on the outer face of the support 14. According to this example, the support 14 includes a multitude of holes 22 for the passage of the light received by the imagers C1, C2, ... Ci, ... Cn and/or emitted by the projectors E1, E2, ... Ei, ... En. For example, the holes 22 as well as the positioning systems 21 are evenly arranged along parallels of the sphere to constitute mounting possibilities for the imagers and the projectors. Of course, the positioning systems 21 for the imagers and the projectors can be arranged on the support 14 to allow their mounting on the inner face of the support 14.

Finally, the projectors E1, E2, ... Ei, ... En and the imagers C1, C2, ... Ci, ... Cn are rigidly assembled on the support 14 by a complete connection 13 which can be made in any suitable manner, such as for example using screw-nut systems, clips or even adhesive means. Thus, these complete connections ensure that the projectors E1, E2, ... Ei, ... En and the imagers C1, C2, ... Ci, ... Cn are mounted without the possibility of movement relative to the support 14.

Such a design facilitates the initial positioning of the projectors E1, E2, ... Ei, ... En and the imagers C1, C2, ... Ci, ... Cn, but also their mounting and dismounting operations during the maintenance operations.

The mounting operations of the projectors and the imagers on the support 14 are such that the optical axes AC1, AC2, ..., ACi, ... ACn of the imagers and the beam directions DE1, DE2, ... DEi, ... DEn of the projectors are defined relative to the reference plane Prfs for the support 14. Advantageously, each detection station includes a setting device that allows making the inspection reference plane Prif, Prib or Pric of the containers moved by the translation system II of the containers coincide with the reference plane Prfs for the support 14. Typically, this setting device can allow moving the support 14 vertically relative to the conveying plane and/or the conveying plane for the containers relative to the support 14 such that, depending on the height of the inspected containers 2, the inspection reference plane Prif, Prib or Pric for the containers coincides with the reference plane Prfs for the support 14.

Of course, the shape of the support 14 is adapted to the size of the set of the containers that can be inspected and to the type of segments of the containers to be inspected to ensure their inspection while allowing their passage. FIG. 1A allows illustrating two different configurations for the supports 14. This FIG. 1A illustrates on the left part, an inspection station for the finish of the containers while the right part illustrates an inspection station for the base of the containers. The inspection of these two parts of containers possibly leads to different dispositions of the imagers and of the projectors on the supports 14 and consequently to a different shape of the supports 14.

In general, the installation 1 is capable of successively including:
  a station for inspecting the finishes of the containers provided with a support 14 delimiting a circulation path for a segment of the containers corresponding to the finish, and/or;
  a station for inspecting the bodies of the containers provided with a support 14 delimiting a circulation path for a segment of the containers corresponding to the body, and/or;
  a station for inspecting the bases of the containers provided with a support 14 delimiting a circulation path for a segment of the containers corresponding to the base.

According to one characteristic of the invention, each inspection station I1, I2, ... in accordance with the invention is capable of inspecting containers 2 whose segments to be inspected have different diameters which are classified in different ranges of diameters. For an inspection station, the range of the diameters of the segments and the number of different ranges are thus chosen. By way of non-limiting exemplary embodiment, the same inspection station can be designed to inspect four different ranges of diameters of container segments, namely, for example, 6 to 22 mm, 22 to 32 mm, 32 to 53 mm and 53 to 82 mm. These ranges of diameters of container segments may not be perfectly disjoint.

Figure 3D:
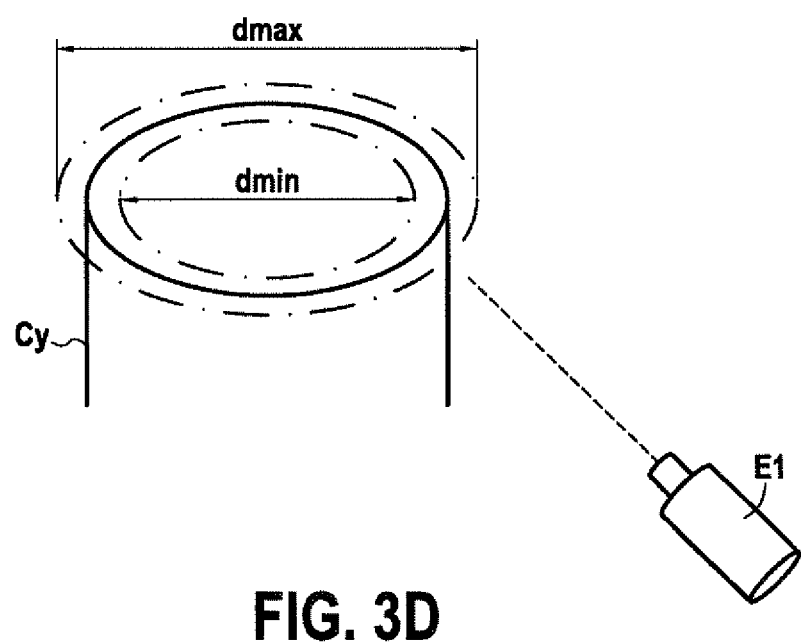
FIG. 3D is a perspective view explaining the positioning of the projectors relative to a container.
Figure 3E:
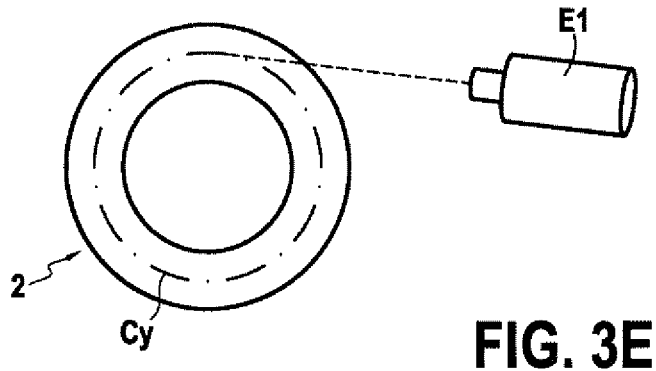
FIG. 3E is a view in the horizontal plane explaining the positioning of the projectors relative to a container.

According to another characteristic of the invention for the detection of the vertical glass diseases, the projectors E1, E2, ... Ei, ... En form several sets each including at least six projectors whose beam direction DE1, DE2, ... DEi, ... DEn is tangent to a cylinder with a diameter included in a determined range of segment diameters. Of course, given the linear displacement of the containers relative to the projectors E1, E2, ... Ei, ... which are fixed, the tangent beam direction is considered at the time of shooting by the imagers C1, C2, ... Ci, ... Cn. As it appears more specifically in FIGS. 3D and 3E, a range of diameters of container segments includes a minimum diameter dmin and a maximum diameter dmax. The cylinder CY has a diameter equal to or greater than the minimum diameter dmin and equal to or smaller than the maximum diameter dmax. Also, to inspect a range of diameters of container segments, the beam direction DE1, DE2, ... DEi, ... DEn of the projectors E1, E2, ... Ei, ... En is tangent to the cylinder CY of diameter included in this range of segment diameters dmin-dmax. The interval dmax-dmin is correctly covered by taking into account the width of the beams. If the beams are narrow, the number of ranges and therefore the number of projectors should be increased. Conversely, if the beams are too wide, then the risks of interference between the image captures are increased, and also the choice of the beam directions which are desired to be accurate is lost. According to one preferred variant, the interval dmin-dmax is comprised between 10 and 30 mm.

As indicated above, the ranges of diameters of container segments are different from one set to another and are a function of the diameter of the segment of the containers. In the exemplary embodiment adapted to inspect four different ranges of diameters of container segments, the projectors E1, E2, . . . Ei, . . . En form four sets each including at least six controllable directional light emitters. It should be understood that the projectors of each set are adapted to light a determined range of diameters of container segments, different from one set to another.

In a complementary manner, the projectors E1, E2, . . . Ei, . . . En of each set are fixed on the support 14 such that the beam directions DE1, DE2, . . . DEi, . . . DEn are distributed in azimuth so that when said projectors are selectively activated for image acquisitions by the imagers C1, C2, . . . Ci, . . . Cn, all the points of the circumference of the segment i of the containers to be inspected are lighted by at least one of the projectors E1, E2, . . . E1, . . . En. In other words, for the inspection of each container falling within a determined range of segment diameters, the projectors E1, E2, . . . Ei, . . . En, forming part of the set inspecting this range of diameters, allow lighting the entire periphery of the segment inspected during the travel along the circulation path and the acquisition of the images by the at least six imagers.

As it appears in the foregoing description that the inspection of each container requires the successive activation of some simultaneously selected imagers of the associated emitters for determined durations. These durations can be such that the inspected container is considered as occupying a fixed or non-fixed position in the inspection area Zi, during the acquisition of the images.

Figure 1C:
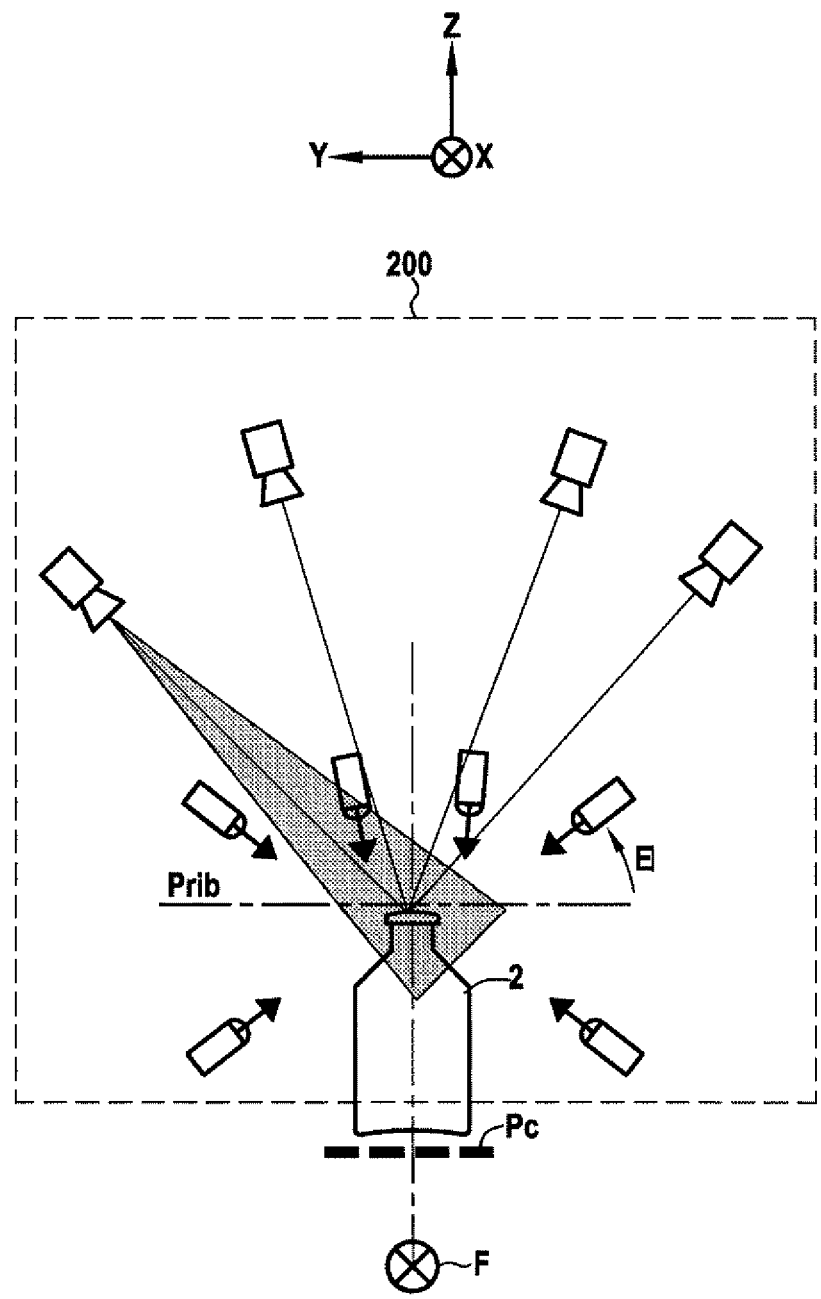
FIG. 1C is a schematic view in the vertical plane showing one exemplary embodiment of part of an installation according to the invention, taken along the direction of displacement of the containers.
Figure 1D:
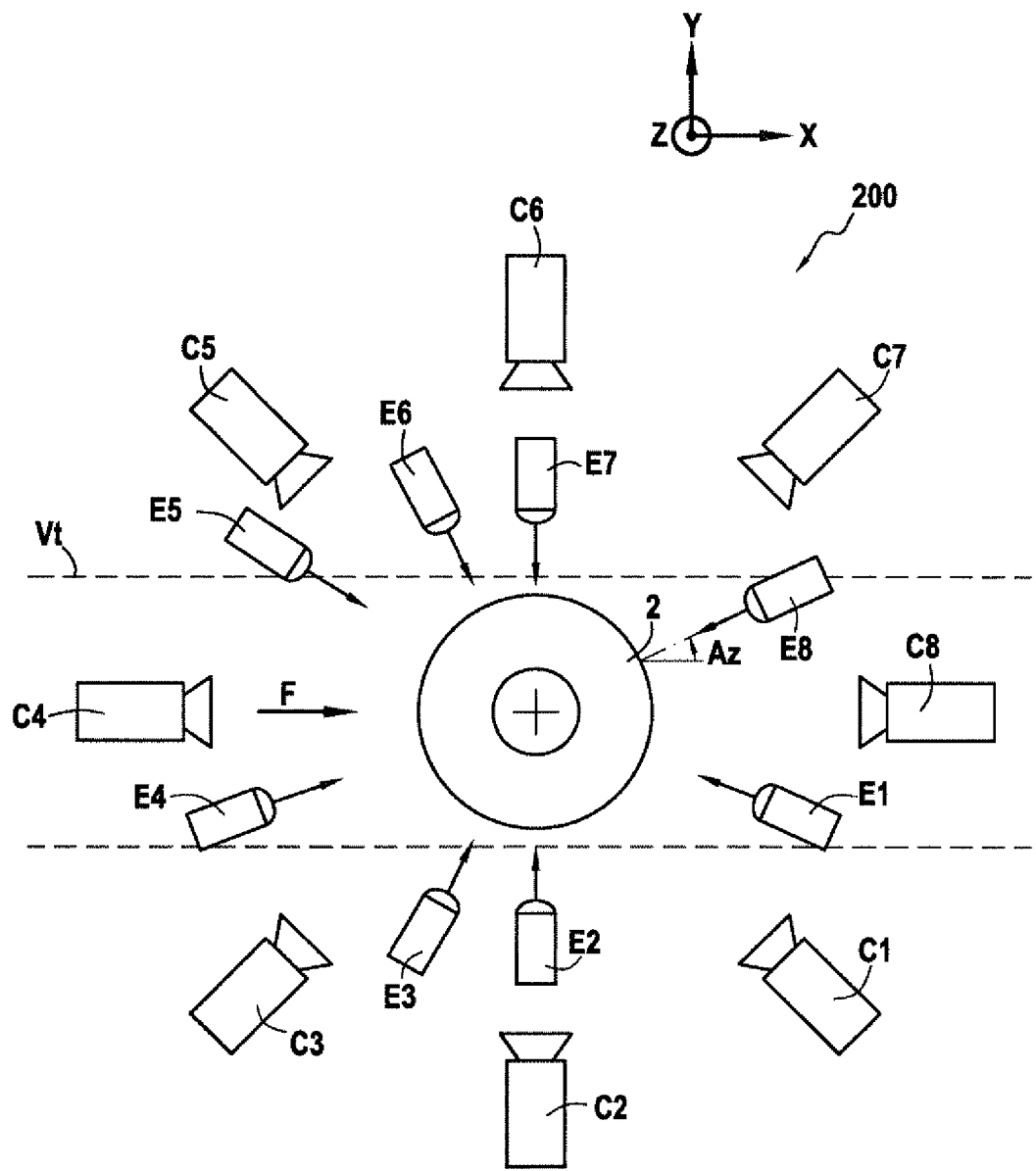
FIG. 1D is a schematic top view showing one exemplary embodiment of part of an installation according to the invention, taken in the horizontal plane.
Figure 3F:
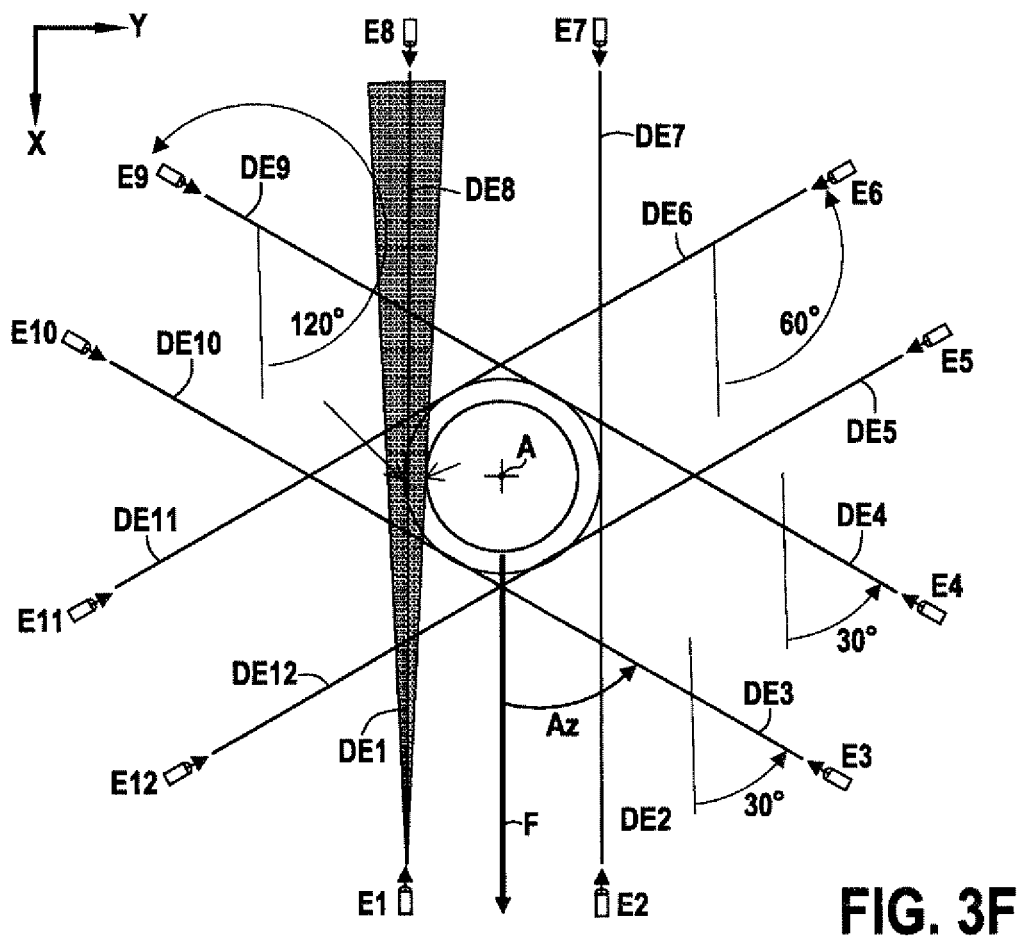
FIG. 3F is a view explaining the lighting in azimuth of the projectors relative to a container.

For the correct detection of the glass diseases, it is necessary that the lighting beams of the projectors reach the segment of the container to be inspected along specific incidence directions, specific incidence angles, and also that the observation by the imagers is done under determined directions. The beam direction of the projectors is the direction followed by the light to reach the container. The direction of observation is the direction of the optical axis of the imager, directed towards the container. By convention, the beam (for the projectors) and observation (for the imagers) directions are defined as follows by their azimuth, their elevation and their radial or tangential, clockwise tangential or counterclockwise tangential incidence. The azimuth is the angle of the projection of the direction of the beam in the X, Y plane, taking as a reference in top view, the direction of displacement F (or the X axis) and the trigonometric direction, from 0° to 360°. The azimuth angel Az is represented in FIGS. 1D and 3F. Also by convention, as illustrated in FIGS. 1A and 1C, the elevation E1 of the beam directions of the projectors DE1, DE2, . . . DEi, . . . DEn or of the directions of observation of the imagers C1, C2, . . . Ci, . . . Cn (therefore their optical axes AC1, AC2, . . . ACi, . . . ACn) is their angle with a plane orthogonal with the central axis A, for example with the inspection reference plane Prif, Prib, Pric. This angle is therefore measured in a vertical plane therefore parallel to the central axis A, containing the beam direction or the optical axis, having with the direction F (or the axis X) the azimuth angle Az of the beam direction or of the optical axis. The elevation angle El measured in the vertical plane, is taken in the trigonometric direction, positive from 0 to 90° when the projector or the imager is in high angle shot, and 0 to −90° when it is in low angle shot relative to the X, Y plane. In FIG. 1C, the radial plane has an azimuth angle of 90°, while in FIG. 1A the radial plane has a zero azimuth angle.

The direction of observation therefore the optical axes AC1, AC2, . . . ACi, . . . ACn of at least six imagers are preferably practically radial, therefore directed towards the center of the inspection area Zi. At the time of acquisition of an image, they observe the containers by practically aiming the central axis A. It is therefore considered that the directions of observation that is to say the optical axes AC1, AC2, . . . ACi, . . . ACn of said imagers are radial. Such imagers, when their field of observation is wide enough, can collectively observe in a complete manner the entirety of the inspected segment of several ranges of diameters, during the displacement of a container passing through the inspection area Zi.

Figure 3G:
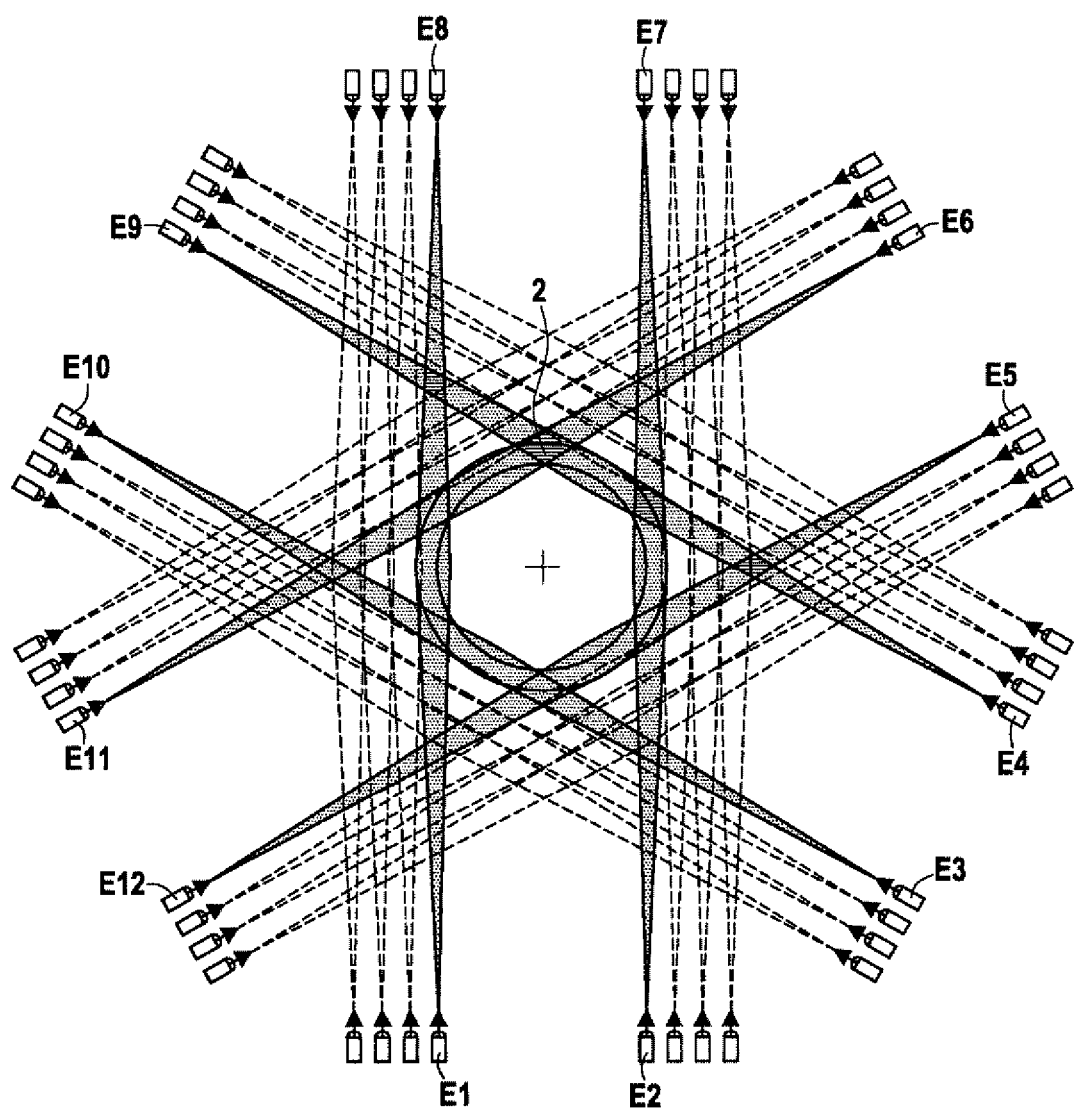
FIG. 3G is a view similar to FIG. 3F explaining the positioning in azimuth of the projectors for the lighting with tangential incidences, of the circumference of containers with different segment diameters.

The inspection station not only comprises projectors with different azimuth and elevation angles as will be described later, but it is also necessary to distinguish the incidences of the beam directions at the point of impact on the container 2, at the time of activation of the projectors. The inspection station comprises projectors with a beam direction incidence called either radial, that is to say the vertical plane which contains the direction passes through the central axis A, as illustrated in FIG. 1D, or tangential to a cylinder as illustrated in FIGS. 3B, 3F and 3G, which are views of the beams in projection in the horizontal plane X, Y. For example, as illustrated in FIG. 3F, the beams E1 to E12 have different azimuths, in order to be able to inspect the entire periphery of the segment of containers to be inspected, which would be cylindrical like the finish. They are of incidence tangential to the cylinder of the segment of containers to be inspected at the time of their triggering. It is seen that the projectors E2, E4, E6, E8, E10, E12 have beam directions DE2, DE4, DE6, DE8, DE10, DE12 distributed in azimuth, tangential to the finish, and with a clockwise incidence of light and the projectors E1, E3, E5, E7, E9, E11 have beam directions DE1, DE3, DE5, DE7, DE9, DE11 distributed in azimuth, tangential to the finish, and with a counterclockwise incidence of light. Thereafter, a clockwise or counterclockwise incidence will implicitly designate an incidence tangent to a cylinder whose axis coincides with the central axis A. It should be noted that to take into consideration the displacement of the container during the inspection, a cylinder offset along the direction of translation F can be considered.

FIG. 3B illustrates, in top view (or in projection in the X, Y plane) that the tangential incidence of the beams allows the detection of vertical (or radial) glass disease. In this schematic view, the vertical glass disease D is represented planar and nearly radial. The incident light tangentially to the cylinder of the segment of the container to be inspected is reflected in the direction of the objective lens of the imager C1. It is seen in this figure that the projectors E4 and E5 are complementary, the projector E5 being counterclockwise and the projector E4 being clockwise. It is also seen that if the segment of the container to be inspected is in another range of larger segment diameters, the invention allows using other projectors (E6, E7, E8, E1, E2, E3) instead of moving the projectors E4 and E5.

Preferably, the lighting fields of several projectors intersect in the inspection area of the inspection station, therefore on the segment of the container to be inspected. Thus, whether for the observation, for the image capture or for the lighting, a covering of the periphery of the container segment to be inspected is created, secured by the overlapping of the fields of observation and the illuminance during the acquisitions of all the images of the container segment to be inspected for each container. In other words, each surface element of the container segment to be inspected is represented in at least one image, illuminated by the projector(s) necessary for revealing defects in these images.

According to the example illustrated in FIG. 3G, the inspection station includes four sets, each comprising six projectors with a clockwise incidence and six projectors with a counterclockwise incidence. Each set thus includes twelve projectors to illuminate segments of containers falling within a range of diameters, the ignition sequence and the associated imagers not being specified. In the example illustrated in FIG. 3G, the twelve projectors E1 to E12 of the first set are illustrated as activated to illuminate the containers having a range of small segment diameters. The twelve projectors of each other set will be activated to illuminate containers falling within the range of larger segment diameters.

According to one advantageous characteristic of embodiment, the projectors E1, E2, . . . Ei, . . . En of the different sets are disposed in an arrangement comprising side by side, one projector from each set. This arrangement is repeated to distribute the projectors in azimuth about the central axis A of the containers. Each arrangement includes for example a projector belonging to each set of projectors, such an arrangement being repeated six times on the circumference of the support 14 when the sets of projectors each include six projectors.

According to one exemplary embodiment of the invention, there is provided for the detection of the glass diseases vertical to the finish, sets of ten projectors, with three different elevations, four ranges of diameters and producing the clockwise and counterclockwise tangential incidences, namely 3×4×2=24 sets of ten projectors. The ten arrangements then each include eight projectors juxtaposed for the elevation −10°, below them, eight projectors juxtaposed for the elevation −20° and finally below, eight projectors juxtaposed for the elevation −30°. The arrangement, which includes at least 24 projectors, exists in ten examples distributed in azimuth. Since these ten arrangements are below the finish reference plane, they leave free the inlet and the outlet of the circulation path (FIG. 1A).

According to another advantageous characteristic of embodiment, each set of projectors E1, E2, . . . Ei, . . . En includes on the one hand, projectors with beam directions distributed in azimuth, tangential to a cylindrical portion of the wall, for example to the finish, and with a clockwise incidence of the light on the wall, and on the other hand, projectors with beam directions, distributed in azimuth, tangential to the cylindrical portion of the wall, and with a counterclockwise incidence of the light on the wall. For example, as it appears in FIGS. 3F and 3G, each set includes at least six projectors E2, E4, E6, E8, E10, E12 with beam directions distributed in azimuth, tangential to the finish, and with a clockwise incidence of the light and at least six projectors E1, E3, E5, E7, E9, E11 with beam directions distributed in azimuth, tangential to the finish, and with a counterclockwise incidence of the light. It should be noted that the projectors E1, E2 have the same azimuth angle equal to 0° whereas the beam directions of the projectors E1, E2 have respectively a counterclockwise and clockwise incidence. Similarly, the projectors E3, E4 have the same azimuth angle equal to 30° while the beam directions of the projectors E3, E4 have respectively a counterclockwise and clockwise incidence. Thus, the beam directions of the six projectors are evenly distributed in azimuth with a 30° offset two by two.

According to one variant of embodiment, each set includes ten projectors E1, E2, . . . Ei, . . . En with beam directions having a clockwise incidence and ten projectors E1, with beam directions having a counterclockwise incidence. If a set includes ten projectors, then the beam directions of the ten projectors are distributed in azimuth angles within each set of ten to obtain the circular covering of the segment of the container to be inspected. Namely, each portion of the circumference which, when passing through the inspection area, will be imaged by at least one imager, will be illuminated according to the incidences desired by at least one projector of the set. For example, for a cylindrical container segment to be inspected, considering a set of 10 projectors having as common property the incidence on the surface of the region inspected at the time of its illumination (azimuth, elevation, clockwise or counterclockwise tangential or radial) each angular sector of $1/10^{th}$)(36° of the cylinder will be illuminated by one of the 10 projectors with said incidence, to the last accuracy related to the limited number (for example 10) of projectors in the set.

According to one variant of embodiment, the projectors E1, E2, . . . Ei, . . . En are distributed symmetrically on either side of the direction of translation F, as it appears in the example illustrated in FIG. 1D.

It is recalled that the projectors E1, E2, . . . Ei, . . . En are located outside the free volume Vt. Also, the projectors positioned at the same height as the free volume Vt have a beam direction with azimuth angles between +5° and +175° and between +185° and +355°. On the other hand, the projectors located above or below a free volume Vt can take any necessary azimuth angle, giving for example a uniform distribution regardless of the number of projectors in each set.

It appears in the preceding description that a given point of a container segment to be inspected located in the inspection area Zi, is in a position to be lighted by several projectors E1, E2, . . . Ei, . . . En according to several beam directions, in particular different in elevation. Through the overlapping of the areas lighted by identical elevation and incidence beams, for different close azimuth values, it is also possible to create a redundancy such that a given point of a container segment to be inspected will be lighted along different beam directions in azimuth. This can be achieved if beams of the same elevation and incidence, spaced apart in azimuth by 10°, cover an angular sector of 20° of the container segment (cutting about the central axis A). Preferably, all the points of the segment to be inspected of a container located in the inspection area Zi are in a position to be lighted at least once when they pass through the inspection area Zi on the circulation path, and during the acquisition of series of images by the imagers, by several projectors along several beam directions.

Of course, the beam directions of the projectors E1, E2, . . . Ei, . . . En are also distributed in elevation in a determined manner. Advantageously, each set of projectors E1, E2, . . . Ei, . . . En includes several subsets of projectors each with an elevation angle of a different absolute value of at least 5°. In other words, for each set, there are at least two projectors with different elevation angles, that is to say having therebetween a deviation of at least 5°.

According to one advantageous characteristic of embodiment, the projectors of the sets have a beam direction with elevation angles of an absolute value between 0° and 45°.

According to the exemplary embodiment cited above, it is provided to choose for each set, three elevation angles for the projectors, namely −10°, −20°, −30°. According to this example, for each value of the elevation angle, each set includes ten projectors E1, E2, . . . Ei, . . . En with beam directions having a clockwise tangential incidence and ten projectors E1, E2, . . . Ei, . . . En with beam directions having a counterclockwise tangential incidence. The inspection station thus includes for each set, sixty projectors with twenty projectors distributed in azimuth for each of the three elevation angle values. As the inspection station includes four sets to inspect four ranges of diameters, the station includes in this example two hundred and forty projectors. Such an inspection station with tangential incidence projectors relates to the detection of the vertical and/or radial glass diseases. This inspection station can of course preferably include sets of projectors and additional imagers for the detection of the horizontal glass diseases on the cylindrical or peripheral parts on a flat base, or other defects.

Of course, the projectors E1, E2, . . . Ei, . . . En lighting the containers 2 are associated with imagers C1, C2, . . . Ci, . . . Cn to detect the specular reflections coming from the glass diseases.

Each detection station I1, I2, . . . includes, for each range of diameters of container segments to be inspected, at least six imagers C1, C2, . . . Ci, . . . Cn forming images and having an optical axis AC1, AC2, . . . ACi, . . . ACn directed inwardly of the inspection area Zi. These imagers C1, C2, . . . Ci, . . . Cn are mounted on the support 14 such that their optical axes AC1, AC2, . . . ACi, . . . ACn are distributed about the central axis A of the containers by choosing their azimuth angles between 0 and 360° relative to the direction of translation, so that all the points of the circumference of the segment inspected are represented in at least one image acquired when the container segment passes through the inspection area. Of course, the number of imagers C1, C2, . . . Ci, . . . Cn with the optical axes distributed in azimuth can be greater than six. According to one exemplary embodiment, twelve imagers with their optical axes AC1, AC2, . . . ACi, . . . ACn distributed in azimuth can be used to take images over the entire circumference of the inspected segment. Advantageously, the imagers C1, C2, . . . Ci, . . . Cn are distributed so as to obtain an overlap of the images taken by the different imagers. This overlap guarantees that any point of the container segment to be inspected is represented in at least one image obtained under the observation and lighting conditions necessary for the detection of a type of defect, for example of the vertical glass disease type.

Furthermore, the imagers C1, C2, . . . Ci, . . . Cn have optical axes AC1, AC2, . . . ACi, . . . ACn whose elevation angles have absolute values between 10° and 90°. Advantageously, at least two imagers have optical axes AC1, AC2, . . . ACi, . . . ACn with elevation angles of different values. According to one exemplary embodiment, the optical axes AC1, AC2, . . . ACi, . . . ACn of the imagers have six different elevation angle values such as 10°, 20°, 30°, 40°, 50° and 60°. According to such an exemplary embodiment, the inspection station thus includes seventy-two imagers AC1, AC2, . . . ACi, . . . ACn with twelve imagers distributed in azimuth for each of the six elevation angle values.

For the detection of the vertical or radial glass diseases, the elevation angles of the optical axes AC1, AC2, . . . ACi, . . . ACn of the imagers are opposite in sign to the elevation angles of the beam directions DE1, DE2, . . . DEi, . . . DEn of the associated controllable projectors. In other words, the imagers C1, C2, . . . Ci, . . . Cn are disposed on one side of the inspection reference plane while the projectors E1, E2, . . . Ei, . . . En are disposed on the other side of the inspection reference plane. It should be noted that the absolute values of the elevation angles of the optical axes of the imagers C1, C2, . . . Ci, . . . Cn are identical to or different from the absolute values of the elevation angles of the beam directions of the associated projectors.

It should be understood that one or several imagers C1, are intended to take images during the lighting by the associated projectors E1, E2, . . . Ei, . . . En. Thus, the electronic system III is adapted to activate one or several imagers C1, C2, . . . Ci, . . . Cn, synchronously with associated projectors E1, E2, . . . Ei, . . . En. This simultaneous activation allows at least one image to be taken while part of the inspected segment is lighted. Such a sequence of lighting and recording the images can be repeated according to different orders which depend on the fixed disposition of the projectors and of the imagers, and on the diameter of the containers. For example, the sequence is repeated along a circumferential direction of the container and/or possibly along an opposite circumferential direction. It is thus possible to light the container successively by simultaneously taking images. During the translation of the containers 2 in the inspection area Zi, it is thus possible to acquire for each container, a series of images for example between its entry in and exit from the inspection area Zi.

The electronic system III records all the images and analyzes them to detect glass disease defects. Each imager delivers several images by cooperating with projectors, different for each image. In general, an imager receives a trigger signal, in response to which the imager will carry out the following steps, the whole of which constitutes the image acquisition: start of exposure, end of exposure, reading and transfer of at least one region of the image.

According to one advantageous variant of the invention, each imager delivers several images of several types by cooperating with different projectors for each image, with the aim of detecting defects of different types, which differ in their nature, their shape and/or or their location in the container. For example, an imager can acquire successively:
  images of a first type to detect vertical glass diseases located in the internal edge of the finish surface, by cooperating with projectors of a first set producing clockwise tangential incidences;
  images of a second type to detect vertical glass diseases located in the internal edge of the finish surface, by cooperating with projectors of a second set producing counterclockwise tangential incidences;
  images of a third type to detect horizontal glass diseases located in the nets of a screw finish, by cooperating with projectors of a third set producing radial incidences directed in the direction of the nets from inside the neck;
  images of a fourth type to detect horizontal glass diseases located under the counter-finish, by cooperating with projectors of a fourth set producing radial incidences in the direction of the counter-finish from inside the neck;
  images of other types to detect defects of other types by cooperating with directional or non-directional projectors belonging to other sets producing dedicated illuminance in the direction of part of the region to be inspected.

The acquisition parameters of the imagers Ci comprise in particular the operating parameters of the industrial cameras, namely:

a time limit or delay between the trigger signal and the beginning of integration and/or, information inhibiting the acquisition and/or, an integration time TI, which is the duration during which the photons are converted into electrical signal by each pixel of a matrix sensor and/or, an analog and/or digital amplification gain G which modifies the signal level produced by the pixels and/or, a choice of analog and/or digital amplification or conversion laws G which can be linear or non-linear, for example logarithmic and/or, the coordinates (x, y, x', y') of one or several areas of interest, called ROI (REGION OF INTEREST) ROI1, ROI2, . . . , which are regions of the sensor whose pixels will be actually transmitted to the processing unit.

Figure 9:
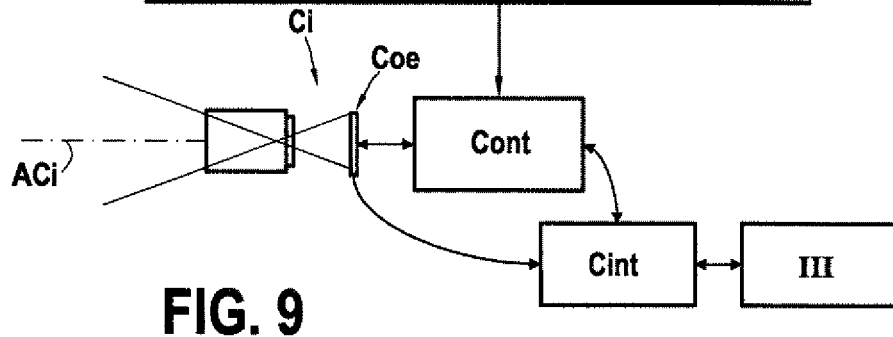
FIG. 9 is a schematic view showing one exemplary embodiment of a control circuit for imagers.

All of these parameters constitute what will be called in this description, a set of acquisition parameters that can be gathered in a table TAB of sets J1, J2, J3 . . . of acquisition parameters, as illustrated in FIG. 9. According to this aspect of the invention, the different acquisitions of images by an imager for each container can be carried out with different sets of acquisition parameters. This allows for example adapting the gain G according to the type of lighting produced or the tint of the container, or selecting and transmitting images of minimum dimensions, limited to the field in which the defects are revealed without transmitting portions of images with unnecessary information.

According to one advantageous variant of the invention, the image acquisitions by an imager for each container can be carried out by reading each time a different region of interest ROI1, ROI2, . . . Said region of interest is dependent on the sought type of defect, on the planned position of the segment of the container to be inspected in the field of the camera at the time of the acquisition, on the dimension and shape of the containers, in particular on the diameter of the neck or the body according to the segment inspected.

An imager according to the invention includes at least one optoelectronic sensor Coe preferably including a matrix of pixels (photosensitive cells). It is of the CCD or CMOS type or any optoelectronic technology able to produce an electronic image. An imager also includes control electronics Cont, which allows modifying the acquisition parameters and communicating, via an interface Cint with a remote electronic system such as the electronic system III. The control electronics Cont can determine the pixel, line, frame clocks, define the ROI areas which will be transmitted, determine the integration time, etc. The control electronics is made up of a set of circuits of any type, which can be fully or partially integrated into the optoelectronic sensor Coe, or distributed within the imager in FPGA CPLD type programmable components, microcontrollers and memories. The control electronics is also connected to any remote system, in this case to the electronic system III, to receive setting commands therefrom, such as at least one set of acquisition parameters and action commands such as a trigger signal. Such a trigger signal is therefore a received signal which triggers the integration of the sensor, then the reading of the sensor, possibly a processing of the signals (for example amplification, filtering, analog-to-digital conversion, deinterlacing, color conversion, etc.) and their transmission in the form of an image, for example a digital image. It is possible that this communication is bidirectional so that the control electronics can give the connected remote system information on the operating state of the imager. The control electronics is also used to deliver to the remote system the images, that is to say the videos in analog format, or preferably the images in digital formats. For that purpose, the control electronics is interfaced with the remote system by means of one or several, generally wired but possibly wireless connections. For example, the wired connections correspond to any communication standards known per se, which allow the transmission of the images, such as "IEEE1394", "CameraLink", "USB 2.0", "USB 3.0", "GiGE" or "CoaXPress".

Thus, the imagers Ci are connected to the electronic system III via a connection of any known type, to receive a trigger signal, and at least one set of acquisition parameters. In the described embodiment, the connection is wired.

Each imager is identified by an identifier, in other words an address, so that a remote system such as the electronic system III connected to several imagers can control each imager differently, that is to say control them or trigger them individually, synchronously or asynchronously, and with a different set of acquisition parameters for each imager. According to the invention, the at least six imagers are connected to the electronic system HI and can be triggered on demand and with different acquisition parameters each time.

One solution to trigger the imagers and carry out successive acquisitions of each imager with a set of different acquisition parameters consists in that the electronic system III programs a new set of acquisition parameters for each imager before the triggering of each imager.

According to one advantageous variant of the invention, the control to electronics Cont of each imager contains a memory able to record a list or a table TAB of several sets of successive acquisition parameters, and a sequencer such that at each trigger the next set of parameters in the list is prepared to determine the acquisition parameters for the next image acquisition. According to the invention, the electronic system HI in a phase of starting or setting the inspection station, programs or records for each imager an equal number of sets of successive acquisition parameters. Then, for each container, depending on the displacement of the container in the inspection area, the electronic system III triggers the acquisitions by sending a trigger signal to each imager. It can also be envisaged to send a single common trigger signal to all the imagers of the installation for each incremental displacement of the container. In this case, the time limit can be different for several imagers so that they trigger their exposure at different times. Sets of parameters indicating not to acquire an image on one of the trigger signals received in sequence can also be provided in the lists of sets of acquisition parameters.

According to the advantageous variant of the invention, each projector Ei is activated several times by cooperating either with an associated imager itself triggered several times, or with different imagers triggered separately over time, to produce different types of images, with the aim of detecting defects of different types, which differ in nature, shape and/or location in the container. For example, a projector can be activated successively to:

produce images of a first type to detect horizontal glass diseases located in the nets of a screw finish, by cooperating with an imager observing the finish under a $1^{st}$ elevation angle;

produce images of a second type to detect horizontal glass diseases located in the nets of a screw finish, by cooperating with an imager observing the finish under a second elevation angle.

The illumination parameters of the projectors Ei comprise for example:

a time limit or delay between the trigger signal and the beginning of illumination and/or, an illumination time, which is the duration for which the light is emitted and/or, the activation or non-activation of the projector in response to a trigger signal and/or, an intensity of light emitted in the case of a monochrome projector, several light intensity values emitted in the case of a polychrome projector by combination of elementary sources of different colors.

Figure 10:
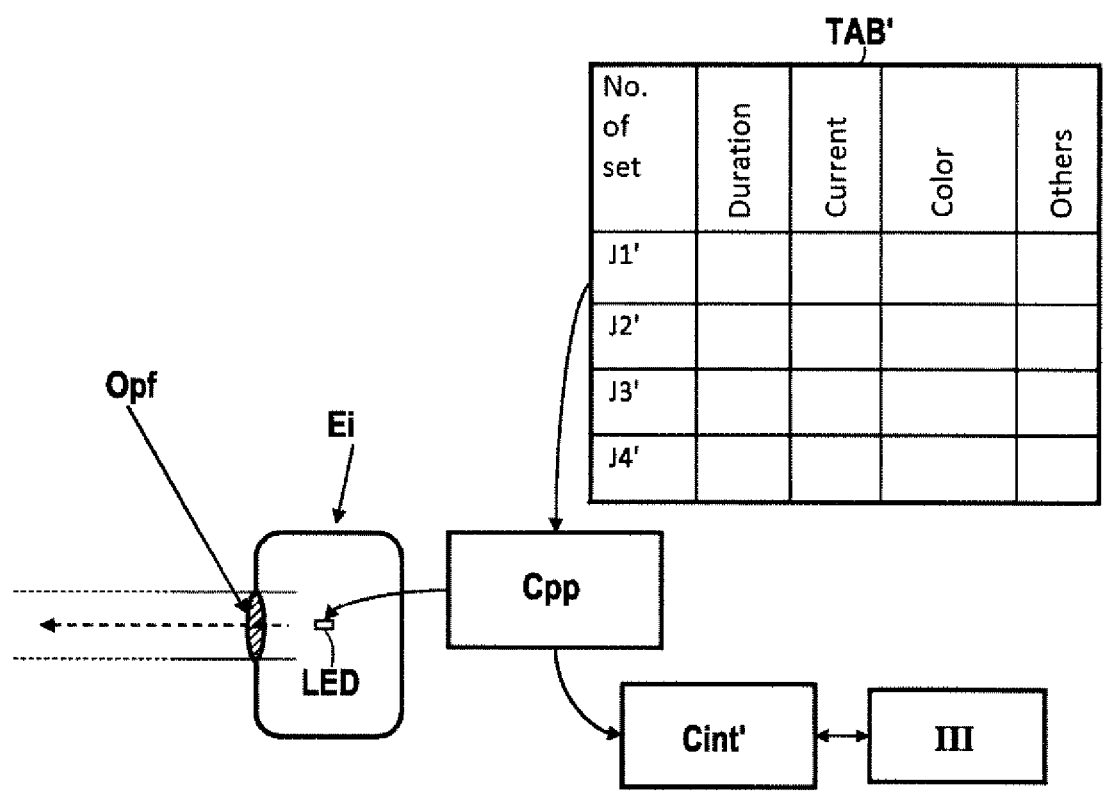
FIG. 10 is a schematic view showing one exemplary embodiment of a control circuit for projectors.

The set of the illumination parameters constitutes what will be called in this description, a set of illumination parameters of a projector that can be gathered in a table TAB' of sets J1', J2', J3'... of acquisition parameters, as illustrated in FIG. 10. According to the invention, the successive or time-distant illuminations of a projector for each container can be carried out with different sets of illumination parameters. This allows for example switching on some projectors and not others during any image acquisition by an imager; or adapting the incident light energy according to the illuminated or inspected regions; or again, groups of projectors can light the same area in different numbers depending on the type of image to be produced and/or the associated imager.

According to the invention, each projector Ei contains at least one light source such as a LED, a power and control electronic circuit Cpp. This power and control electronic circuit Cpp checks the storage, the charging and the discharging of the electrical energy in the LED(s). For example, the electric charge storage is a capacitance. Each projector is connected to a power supply and to the electronic system III by a connection, for example wired connection, via an interface circuit Cint'. A network is organized to connect all the projectors to the electronic system III. The connection operates according to a bus-type communication protocol, allowing the electronic system III to separately address each projector or each set of projectors to provide it with at least one set of illumination parameters and one trigger signal. It is recalled that in a set of projectors, the projectors have the same beam directions relative to the segment of containers to be inspected at the time of their activation, therefore the same detection function.

According to one advantageous variant of the invention, the control electronics of each projector or set contains a memory able to record a list or a table of several sets of successive illumination parameters, and a sequencer such that at each trigger signal, the set of illumination parameters applied corresponds to the next set in the list.

According to the invention, the electronic system III in a phase of starting or setting the inspection station, programs or records for each projector, an equal number of sets of successive illumination parameters. Then, for each container, depending on the displacement of the container in the inspection area, the electronic system III triggers the image acquisitions and the illuminations by sending a trigger signal to each imager and each projector. It can also be envisaged to send a single common trigger signal to all the projectors of the inspection station for each incremental displacement of the container. Sets of parameters indicating not to illuminate the projector on a trigger signal are provided in the lists of sets of illumination parameters. Thus, the projectors are only lighted to contribute to specific conditions of illumination of a region of the item for an observation by a given imager with the aim of detecting given defects.

This solution offers several advantages.

First, if there is a large number of imagers and a large number of projectors, and many image acquisitions to be made with different sets of acquisition and illumination parameters each time, it becomes very long, complicated and risky to program the set of imagers and projectors before each acquisition.

For example, according to one variant of the invention, the number of imagers is greater than 20 and the number of projectors is greater than 100, the acquisition frequency is on the order of 1,000 images per second. It is easier to pre-program the imagers and the projectors in a setting phase and then trigger them simply according to the displacement of the container in the inspection area.

According to another variant of the invention, each projector is composed of an individual light source that can be controlled and provided with a focusing optics Opf.

Of course, to initialize the inspection of each container, it is advantageous to determine the position of each container using for example an imager. Preferably, sensors such as cells (light barrier) detect the time of passage of a container at a specific location and a sensor such as an incremental encoder informs the electronic system HI of the displacements of the conveyor, which is allows according to a well-known method, locating at any time the position of a container along the circulation path.

The electronic system III, illustrated symbolically in the drawings, can be made in the form of at least one standard computer, therefore including at least one microprocessor, one or several electronic memory units and one or several display (screen, projector, holographic display, etc.), input (keyboard, mouse, touchpad, touch screen, etc.), and/or communication (USB, Ethernet®, Wi-Fi®, Bluetooth®, Zigbee®, ...) interfaces. The electronic system III can comprise a computer network sharing data with one or several other computers on the network, or with other networks, for example by an Internet or Ethernet® protocol. In addition to its obvious connection, the computer system III can be connected to sensors providing state information on the installation, and/or to actuators of the installation (conveyors, ejectors, encoder cells, etc.). The computer system III can be advantageously connected to the projectors and to the imagers to acquire operating data therefrom, and/or to ensure their checking. The computer system III implements one or more software, stored and/or executed locally or remotely, including on one or several remote computer servers. This or these software preferably comprise one or several software programmed to implement the method according to the invention.

As part of the inspection station in accordance with the invention, the electronic system III is configured to inspect the containers falling within all of the ranges of diameters. During the inspection of the containers whose inspected segment diameter is included in the range of diameters of a set, the electronic system ensures the acquisition of at least six images of each container by selectively activating the at least six imagers simultaneously with the associated projectors of said set.

The electronic system III is configured to make each image acquisition for the detection of vertical glass diseases in the finish under clockwise lighting, as follows. It determines at any time by a known tracking method, the precise position of a traveling container in the area. Knowing the diameter of the container segment to be inspected, it determines the moment when the container segment to be inspected or an angular sector of the container segment to be inspected is at the same time in the field of an imager and illuminated under the desired incidence of at least one projector. It therefore triggers said imager and said selected projector. This projector therefore belongs to the set of projectors tangent to the cylinder corresponding to the range of diameters of the container segment to be inspected. Several projectors positioned for the same range of diameters of container segments, for example with different elevations, can be activated during this image acquisition. This operation is therefore generalized to the whole container segment to be inspected, to the images for the detection of vertical glass diseases under counterclockwise lighting and also to the images for the detection of horizontal glass diseases under centered lighting.

The electronic system III is also configured to avoid interference. According to one preferred embodiment, all the imagers are independent, and consist each of a sensor and an objective lens. Interference corresponds to the situation where the light emitted by a projector to illuminate a part of the container segment to be inspected so that a given type of defect can be seen by a given imager, creates a stray light in the absence of a defect in the container segment, the stray element being considered as a defect by another imager. The projector/imager pairs are controlled sequentially to avoid this effect. It should be noted that as the integration times of the imagers are very short, between 50 μs and 1 ms, this authorizes a large number of acquisitions separated temporally in a short time interval corresponding to the containers passing through the inspection area Zi. In one exemplary embodiment, the method for detecting horizontal and vertical glass disease-type defects in the finish consists in acquiring and analyzing by means of 32 to 96 imagers, 300 to 1,200 projectors of an electronic system III, 500 to 2,000 images of each container.

For the detection of the horizontal glass diseases, a detection station I1, I2, . . . includes several groupings of at least six projectors E1, E2, . . . Ei, . . . En, designated in the following description by BH groupings. These BH groupings are mounted by a complete connection 13 on the support 14 while being located outside the free volume V1, as described previously. According to one variant, the projectors E1, E2, . . . Ei, . . . En of a BH grouping illuminate an inspected segment included in a range of diameters, this range being different from one grouping to another. Otherwise, according to another variant, the BH groupings are adapted to all the ranges of diameters of the container segments. The projectors of a BH grouping are activated successively for image acquisitions by associated imagers C1, C2, . . . Ci, . . . Cn, such that all the points of the circumference of the inspected segment of the containers are lighted by at least one of the projectors in the set of the images produced for the detection of the horizontal glass diseases. The projectors E1, E2, . . . Ei, . . . En of a BH grouping have a beam direction DE1, DE2, . . . DEi, . . . DEn according to an elevation of the same sign as the elevation of the optical axis AC1, AC2, . . . ACi, . . . ACn of the associated imagers C1, C2, . . . Ci, . . . Cn. Their beam directions are not tangent to the cylinders but directed towards the normal axis A of the containers at the time of their activation by the electronic system III.

The following description describes the variant of embodiment of the inspection station I2 illustrated to the right of FIG. 1A, to illustrate how the invention is implemented to inspect radial or circular glass diseases in the base.

According to one preferred configuration of the station I2, the imagers for checking the glass diseases in the base are located below the reference plane.

The radial glass diseases in the base of the containers, therefore oriented rather radially, are detected in the same way as the vertical glass diseases for the finish of the containers, in other words, for these radial glass diseases (FIGS. 9A and 9B), sets of projectors E1, E2, . . . Ei, . . . En are used, disposed on the support 14 to be able at the time of their activation to light the inspected portion corresponding to the base, along the beam directions DE1, DE2, . . . DEi, . . . DEn tangent to one or several cylinders CY, so as to inspect containers whose bases have a diameter comprised in a range of specific diameters. Since the base is not a ring but a disk, the tangential projectors must illuminate the entire disk from its center to the edge, as indicated in FIG. 9C. Of course, sets with clockwise and other counterclockwise incidences are used. Thus, at least as many sets of projectors in the base as there are in the finish are provided for the detection of glass diseases. It can therefore be summarized that the radial glass diseases in the base are detected by activating sets of projectors whose beam directions are tangent to circles depending on the range to which the diameter of the container segment to be inspected belongs, including sets of clockwise or counterclockwise incidence. These sets are disposed opposite to the associated imagers relative to the reference plane and can preferably have several subsets whose beam direction has several different elevation values, several projectors being activated if necessary for the same associated imager.

Figure 8D:
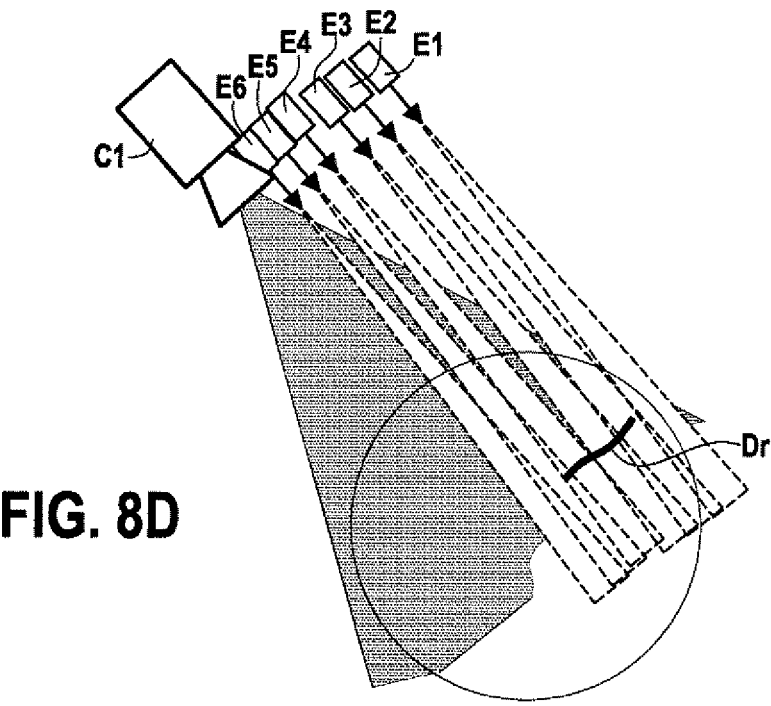
FIG. 8D is a schematic bottom view showing a lighting and observation principle with a series of projectors for the detection of glass diseases in the base of the containers.

For the detection of the glass diseases in the base of the containers, it can also be considered that the circular glass diseases, therefore oriented rather in a circular manner, are detected in the same way as the glass diseases called horizontal glass diseases for the finish of the containers. For these circular glass diseases (FIG. 8B) sets of projectors E1, E2, . . . Ei, . . . En will be used, disposed on the support 14 to be able at the time of their activation to light the container segment to be inspected corresponding to the base, along beam directions DE1, DE2, . . . DEi, . . . DEn oriented in the direction of the center of the base CF, coinciding with the central axis A, but to reach concentric circles of different radii, so as to inspect containers whose bases have a diameter comprised in a range of specific diameters. These sets of projectors must illuminate the base from the center to the edge as indicated in FIG. 8D.

Some projectors are located on the same side of the reference plane Prf for the base as the used imagers.

Of course, the base of the containers is not strictly flat and can even include a push-up. The method and the device are suitable for push-up bases.

The method according to the invention for detecting glass disease-type defects in a container segment by means of a station in accordance with the invention consists:

for each type of glass disease detection, namely the detection of radial or vertical glass diseases under clockwise incidence, and/or the detection of radial or vertical glass diseases under counterclockwise incidence;

and for each of at least six angular sectors of the container segment to be inspected;

and for a determined range of diameters of the container segment to be inspected;

in determining in advance, based on a measurement of the displacement of the containers in the inspection area, the moment when the angular sector of the segment to be inspected of each container 2 will be observed in the inspection area Zi under an observation angle Az, El given by an imager selected and illuminated under one or several angles Az, EL and (radial or clockwise tangential or counterclockwise tangential) incidences given by at least one projector selected among the set corresponding to the range of diameters of the segment [dmin dmax] including that of the container segment to be inspected;

and in triggering at the determined moment, the selected imager and the selected projector(s) such that each angular sector of the container segment to be inspected is completely inspected to detect each type of glass disease.

The method therefore comprises as many image acquisitions during the course as there are inspected angular sectors of the segment and types of defects. The number of angular sectors of the inspected segment is less than or equal to the number of imagers whose direction of observation or optical axis AC1 . . . ACn has the same elevation. The number of projectors in each set is greater than or equal to the number of angular sectors. The total number of sets of projectors corresponds to the number of required beam directions.

Many images will therefore be analyzed to look for defects. For example between 500 and 2,000 images for each container.

The image analysis consists in particular in detecting the white reflections on a black background corresponding to the light reflected by the glass diseases. It also consists in discriminating the spots associated with defects, compared to possible stray reflections.

The invention claimed is:

1. A station for detecting glass disease-type defects in a segment of containers (2) having a central axis (A) and traveling along a direction of translation, without rotation about their central axis, the station including:

a support (14) disposed along a circulation path in which circulates at least one segment of the containers extending below a finish inspection reference plane (Prib) or above a base inspection reference plane (Prif), the circulation path (Vt) successively comprising an inlet, an inspection area and an outlet for the containers;

at least six imagers (C1, C2, . . . Ci, . . . Cn) forming images and having an optical axis directed inwardly of the inspection area by being mounted on the support such that their optical axes are distributed about the central axis (A) of the containers by choosing their azimuth angles between 0 and 360° relative to the direction of translation, so that all the points of the circumference of the segment of the containers are represented in at least one image acquired when the container segment passes through the inspection area;

at least twelve projectors (E1, E2, . . . Ei, . . . En) forming several sets each including at least six projectors mounted on the support, each having a beam direction and positioned on the support such that:

(a) the beam directions (DE1, DE2, . . . DEi, . . . DEn) are tangent to a cylinder centered on the central axis (A) of the container, the diameter of the cylinder being included in a range of diameters of container segments;

(b) the beam directions (DE1, DE2, . . . DEi, . . . DEn) are distributed in azimuth such that when the projectors are selectively activated for image acquisitions by the associated imagers, all the points on the circumference of the segment of the containers are lighted by at least one of the projectors;

an electronic system (III) connected to the projectors and to the imagers and adapted to selectively activate the imagers simultaneously with associated projectors so as to acquire images of each container passing through the inspection area with a view to their analysis in order to detect defects;

characterized in that:

the support (14) is a non-deformable body on which the projectors and the imagers are mounted by a complete connection (13) so as to fix, relative to said support, the beam directions (DE1, DE2, . . . DEi, . . . DEn) of the projectors and the optical axes (AC1, AC2, . . . ACi, . . . ACn) of the imagers, this support including a free volume (Vt) encompassing at least the volume generated by the profile of the containers only according to the rectilinear translation of the containers in the inspection area, the imagers and the projectors being located outside this free volume;

several sets of projectors each include at least six projectors whose beam direction is tangent to a cylinder of a diameter included in a determined range of diameters, these ranges of diameters being different from one set to another and depending on the diameter of the segment of the container;

the projectors of the sets have a beam direction with elevation angles of an absolute value between 0° and 45° and opposite in sign to the elevation angles of the optical axes of the associated imagers;

the imagers have optical axes whose elevation angles have an absolute value between 0° and 60° and are opposite in sign to the elevation angles of the beam directions of the associated projectors;

the electronic system (III) is configured to inspect the containers falling within all of said ranges of diameters, such that during the inspection of the containers whose segment diameter to be inspected is included in the range of diameters of a set, the electronic system ensures the acquisition of at least six images of each container when it passes through the inspection area by selectively activating the at least six imagers simultaneously with the associated projectors of said set.

2. The inspection station according to claim 1, according to which the projectors (E1, E2, . . . Ei, . . . En) of the different sets are disposed in an arrangement comprising, side by side and/or in a juxtaposed manner, a controllable projector of each set, said arrangement being repeated to distribute the controllable projectors in azimuth about the central axis (A) of the containers.

3. The inspection station according to claim 1, according to which the sets of projectors (E1, E2, . . . Ei, . . . En) include several sub-sets each including at least six projectors and each with an elevation angle of a different absolute value of at least 5°.

4. The inspection station according to claim 1, according to which each set includes at least six projectors (E1, E2, . . . Ei, . . . En) with beam directions having in azimuth, an incidence on the clockwise tangential container segment, and at least six projectors with beam directions having in azimuth an incidence on the counterclockwise tangential container segment.

5. The inspection station according to claim 1, according to which the support (14) delimits the free volume with a width such that the projectors (E1, E2, . . . Ei, . . . En) positioned at the same height as the free volume, have a beam direction with azimuth angles between +5° and +175° and between +185° and +355°.

6. The inspection station according to claim 1, according to which the support (14) delimits the circulation path for a segment of the containers corresponding to the finish or to the base of the containers.

7. The inspection station according to claim 1, according to which several groupings (BH) of at least six projectors (E1, E2, . . . Ei, . . . En) are mounted by a complete connection (13) on the support (14) while being located outside the free volume, the projectors of a grouping illuminating a container segment included in a range of diameters, said range being different from one grouping to another, the projectors of a grouping being selectively activated in a synchronized manner with associated imagers during each image acquisition by said associated imagers, such that all the points of the circumference of the segment of the containers to be inspected are lighted by at least one of the projectors, the projectors of a grouping (BH) having a beam direction according to an elevation of the same sign as the elevation of the optical axis of the associated imagers.

8. The inspection station according to claim 1, wherein the support (14) has two openings (16, 17) arranged diametrically opposite to each other according to a fixed profile and defining the inlet and the outlet of the circulation path of the containers (2) and framing the free volume.

9. The inspection station according to claim 1, according to which the support (14) includes a positioning system (21) for the imagers (C1, C2, . . . Ci, . . . Cn) and the projectors (E1, E2, . . . Ei, . . . En), ensuring for each one a unique position, relative to a reference plane (Prfs) for the support, of the beam direction of the projector and of the optical axis of the imager.

10. The inspection station according to claim 1, according to which the positioning systems (21) for the imagers (C1, C2, . . . Ci, . . . Cn) and the projectors (E1, E2, . . . Ei, . . . En) are arranged on the support (14) to allow their mounting on the outer face of the support, the support (14) including a multitude of holes (22) for the passage of the light received by the imagers and/or emitted by the projectors.

11. The inspection station according to claim 1, according to which the support (14) is a non-deformable hollow body having the shape of a polyhedron or of at least one truncated sphere.

12. An inspection installation including:
at least one inspection station in accordance with claim 1;
at least one transport system (II) adapted to ensure the travel, without rotation, of the containers only according to a rectilinear direction of translation, in the circulation path of each support (14).

13. The inspection installation according to claim 12, including:
a station for inspecting the finishes of the containers provided with a support (14) delimiting a circulation path for a segment of the containers corresponding to the finish, and/or;
a station for inspecting the bodies of the containers provided with a support (14) delimiting a circulation path for a segment of the containers corresponding to the body, and/or;
a station for inspecting the bases of the containers provided with a support (14) delimiting a circulation path for a segment of the containers corresponding to the base.

14. The inspection installation according to claim 12, according to which a setting device allows the inspection reference plane for the containers moved by the translation system to coincide with the reference plane for the support.

15. A method for detecting glass disease-type defects in at least one segment of containers having a central axis (A), the method being such that:

a determined number of ranges of diameters for the segments of the containers to be inspected is chosen;
the containers are moved without rotation about their central axis (A) only according to a rectilinear direction of translation to travel in a circulation path of a support comprising successively an inlet, an inspection area and an outlet for the containers;
projectors (E1, E2, . . . Ei, . . . En) and imagers (C1, C2, . . . Ci, . . . Cn) are mounted by a complete connection (13) on the support (14) so as to fix, relative to the support, the beam directions of the projectors and the optical axes of the imagers, this support including a free volume encompassing at least the volume generated by the profile of the containers only according to the rectilinear translation of the containers in the inspection area, the imagers and the projectors being located outside this free volume;
at least six imagers (C1, C2, . . . Ci, . . . Cn) forming images and having an optical axis directed inwardly of the inspection area are mounted on the support such that their optical axes are distributed about the vertical axis of the containers by choosing their azimuth angles between 0 and 360° relative to the direction of translation, so that all the points of the circumference of the segment of the containers are represented in at least one image acquired when the container segment passes through the inspection area, the imagers having optical axes whose elevation angles have an absolute value between 0° and 90° and are opposite in sign to the elevation angles of the beam directions of the associated projectors;
the projectors (E1, E2, . . . Ei, . . . En) form several sets each including at least six projectors whose beam direction is tangent to a cylinder with a diameter centered on the central axis (A) of the container and included in a determined range of diameters, these ranges of diameters being different from one set to another and a function of the diameter of the segment of the containers;
the projectors of the sets have a beam direction with elevation angles of an absolute value between 10° and 45° and opposite in sign to the elevation angles of the optical axes of the associated imagers, the beam directions being distributed in azimuth such that when the projectors are successively activated for image acquisitions by the associated imagers, all the points of the circumference of the segment of the containers are lighted by at least one of the projectors;
during a phase of inspecting the containers whose container segment diameter is included in the range of diameters of a set, the at least six imagers are activated selectively and simultaneously with the associated projectors of said set to acquire at least six images of each container passing through the inspection area with a view to their analysis in order to detect defects.

16. The method according to claim 15, characterized in that it includes a setting phase during which, depending at least on the range of diameters for the segments of the containers to be inspected:
the list of sets of acquisition parameters is recorded in all the imagers, said sets of acquisition parameters including an integration time, a gain, the coordinates of a ROI, and/or information inhibiting the acquisition;
the list of sets of illumination parameters is recorded in all the projectors, said sets of illumination parameters including a time and/or a light intensity, and/or information inhibiting the illumination.

17. The method according to claim 16, characterized in that during the phase of inspecting each container:

simultaneously addressing, on the one hand, to imagers (C1, C2, . . . Ci, . . . Cn) at least a first signal which triggers for each one the acquisition of images according to a set of acquisition parameters taken from its own list of sets of acquisition parameters, and on the other hand, to projectors a signal which triggers the illumination of the container by each projector according to a set of illumination parameters taken from its own list of sets of illumination parameters, one of the parameters possibly meaning that no illumination is made;

simultaneously addressing in a time-shifted manner, on the one hand, to imagers (C1, C2, . . . Ci, . . . Cn) at least a second signal which triggers another acquisition of images according to another set of acquisition parameters taken from the list of each imager, and on the other hand, to projectors a second signal which triggers the illumination of the container by the projectors according to another set of illumination parameters.

\* \* \* \* \*